United States Patent
Ogita

(10) Patent No.: US 10,061,783 B2
(45) Date of Patent: Aug. 28, 2018

(54) INFORMATION PROCESSING APPARATUS, INFORMATION PROCESSING METHOD, AND INFORMATION PROCESSING PROGRAM

(71) Applicant: RAKUTEN, INC., Tokyo (JP)

(72) Inventor: Takehiro Ogita, Tokyo (JP)

(73) Assignee: Rakuten, Inc., Tokyo (JP)

( * ) Notice: Subject to any disclaimer, the term of this patent is extended or adjusted under 35 U.S.C. 154(b) by 209 days.

(21) Appl. No.: 14/655,806

(22) PCT Filed: Nov. 28, 2014

(86) PCT No.: PCT/JP2014/081566
§ 371 (c)(1),
(2) Date: Jun. 26, 2015

(87) PCT Pub. No.: WO2016/084230
PCT Pub. Date: Jun. 2, 2016

(65) Prior Publication Data
US 2016/0342625 A1  Nov. 24, 2016

(51) Int. Cl.
*G06F 17/00* (2006.01)
*G06F 17/30* (2006.01)
*G06F 17/21* (2006.01)
*G06Q 30/06* (2012.01)

(52) U.S. Cl.
CPC ...... *G06F 17/30268* (2013.01); *G06F 17/218* (2013.01); *G06F 17/3028* (2013.01); *G06F 17/30598* (2013.01); *G06F 17/30867* (2013.01); *G06Q 30/0623* (2013.01)

(58) Field of Classification Search
CPC .................................................. G06F 17/218
See application file for complete search history.

(56) References Cited

FOREIGN PATENT DOCUMENTS

JP    2002-092507 A    3/2002

*Primary Examiner* — Ajith Jacob
(74) *Attorney, Agent, or Firm* — Sughrue Mion, PLLC

(57) ABSTRACT

An information processing apparatus extracts a plurality of combinations among combinations of attributes, in different attribute categories, of an item from display information indicating display details of a web page for the item. Each of the extracted combinations is associated with available/unavailable information indicating whether the item having the attribute combination is available for order. The information processing apparatus stores, for each combination available for order among the extracted combinations, a tag indicating the combination and corresponding to search criteria of the logical AND of a plurality of attributes constituting the combination, in association with item identification information identifying the item in a tag storage unit. The information processing apparatus deletes, when a tag indicating an attribute combination unavailable for order is stored in association with the item identification information in the tag storage unit, the tag.

16 Claims, 17 Drawing Sheets

FIG.3A

AAAAA SHIRT ABC SPECIAL PRICE!

ITEM ID 11111111
PRICE 980 YEN

........................................
........................................

SIZE X COLOR

|   | NAVY | BLACK | WHITE |
|---|------|-------|-------|
| S | ○ | ○ | ○ |
| M | ○ | ○ | × |
| L | × | ○ | × |

— 220

QUANTITY [1] [ADD TO CART] — 210

XXX TAILORS SHIRT DEF

ITEM ID 12345678
PRICE 1,000 YEN

........................................
........................................

SIZE [L ▼] — 230

COLOR [SELECT ▼] — 240
      BLACK
      WHITE

QUANTITY [1] [ADD TO CART] — 210

........................................
........................................
........................................
..............

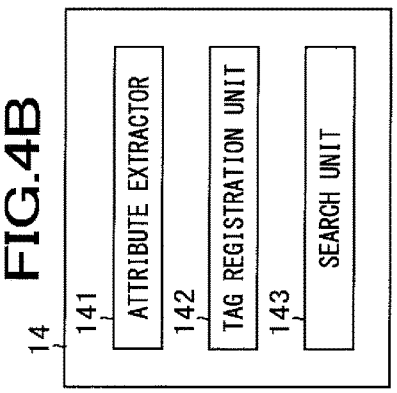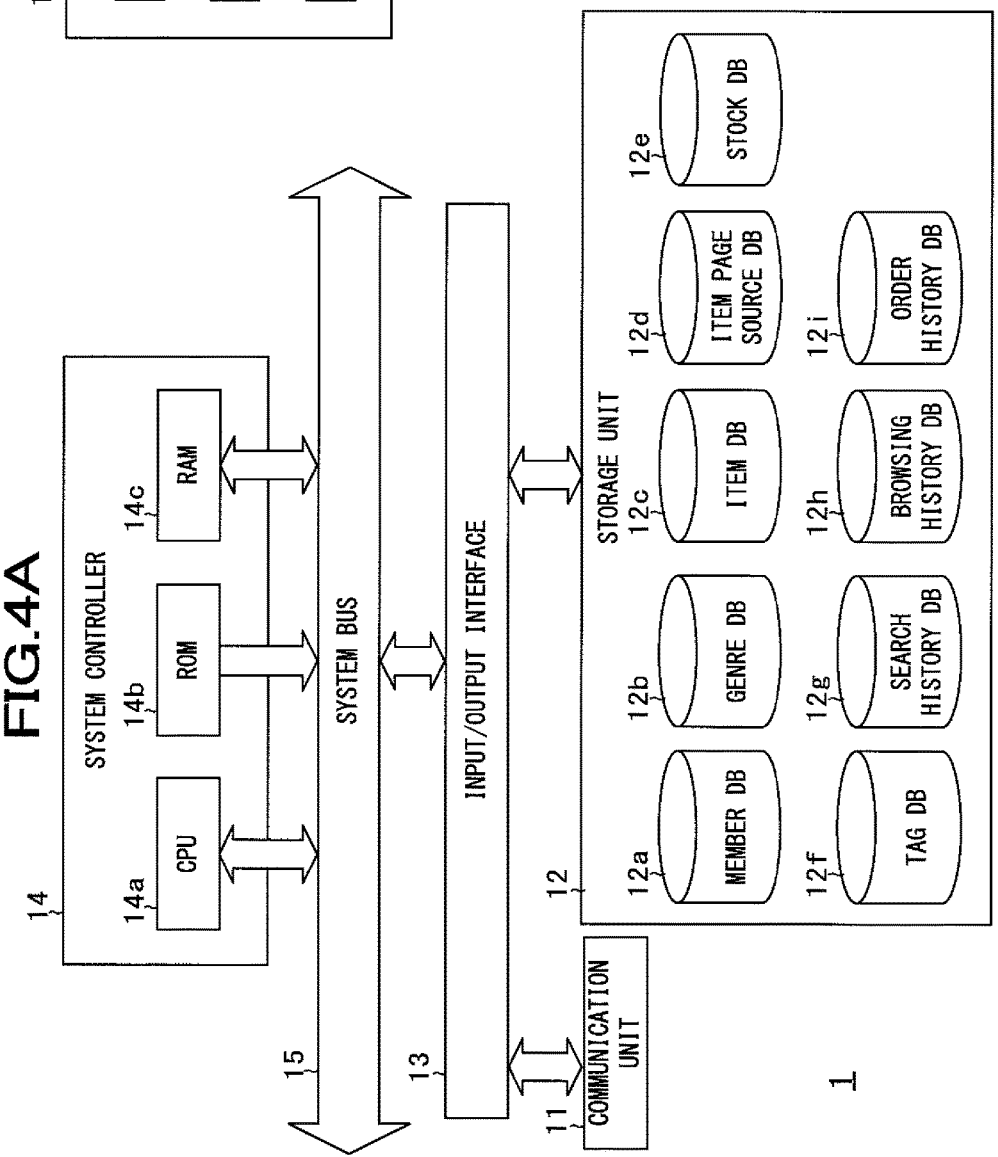

FIG.5A
MEMBER DB 12a

| USER ID |
|---|
| PASSWORD |
| NICKNAME |
| NAME |
| BIRTH DATE |
| GENDER |
| ZIP CODE |
| ADDRESS |
| TELEPHONE NUMBER |
| E-MAIL ADDRESS |
| CREDIT CARD INFORMATION |
| . . . |

FIG.5B
GENRE DB 12b

| GENRE ID |
|---|
| GENRE NAME |
| LEVEL |
| PARENT GENRE ID |
| CHILD GENRE LIST |
| ATTRIBUTE DEFINITION INFORMATION 1 |
| ATTRIBUTE DEFINITION INFORMATION 2 |
| . . . |

FIG.5C
ATTRIBUTE DEFINITION INFORMATION

| ATTRIBUTE NAME |
|---|
| ATTRIBUTE VALUE INFORMATION |
| . . . |

FIG.5D
ITEM DB 12c

| STORE ID |
|---|
| ITEM ID |
| PRODUCT CODE |
| GENRE ID |
| ITEM NAME |
| . . . |

FIG.5E
ITEM PAGE SOURCE DB 12d

| ITEM ID |
|---|
| SOURCE INFORMATION |
| URL |

FIG.5F
STOCK DB 12e

| STOCK ID |
|---|
| ITEM ID |
| STOCK STATUS |

FIG.5G
TAG DB 12f

| ITEM ID |
|---|
| TAG |

FIG.5H
SEARCH HISTORY DB 12g

| USER ID |
|---|
| SEARCH DATE AND TIME |
| SEARCH CRITERIA |

FIG.5I
BROWSING HISTORY DB 12h

| USER ID |
|---|
| ITEM ID |
| BROWSING DATE AND TIME |

FIG.5J
ORDER HISTORY DB 12i

| USER ID |
|---|
| ITEM ID |
| ORDER DATE AND TIME |
| ITEM ATTRIBUTE 1 |
| ITEM ATTRIBUTE 2 |
| . . . |

FIG.6A

| GENRE NAME | | TOPS |
|---|---|---|
| ATTRIBUTE DEFINITION INFORMATION 1 | ATTRIBUTE NAME | COLOR |
| | ATTRIBUTE VALUE INFORMATION | WHITE |
| | | BLACK |
| | | NAVY |
| | | RED |
| | | ... |
| ATTRIBUTE DEFINITION INFORMATION 2 | ATTRIBUTE NAME | SIZE |
| | ATTRIBUTE VALUE INFORMATION | SMALL |
| | | MEDIUM |
| | | LARGE |
| | | EXTRA LARGE |
| | | ... |
| ... | ... | ... |

FIG.6B

| ITEM ID | TAG |
|---|---|
| 11111111 | COLOR = NAVY * SIZE = SMALL |
| 11111111 | COLOR = BLACK * SIZE = SMALL |
| 11111111 | COLOR = WHITE * SIZE = SMALL |
| 11111111 | COLOR = NAVY * SIZE = MEDIUM |
| 11111111 | COLOR = BLACK * SIZE = MEDIUM |
| 11111111 | COLOR = BLACK * SIZE = LARGE |
| 12345678 | COLOR = BLACK * SIZE = LARGE |
| 12345678 | COLOR = WHITE * SIZE = LARGE |
| ... | ... |

FIG.16

FIRST SEARCH REQUEST
SEARCH CRITERIA | SHIRT LARGE |

↓

SEARCH RESULTS
| SHIRT ABC |
| ⋮ |

↓

ITEM PAGE
| SHIRT ABC<br>"NAVY & LARGE" AND "WHITE &<br>LARGE" ARE UNAVAILABLE FOR ORDER |

↓

PLACE NO ORDER

↓

THIRD SEARCH REQUEST
SEARCH CRITERIA | SWEATER |

↓

COLOR OF SHIRT ABC
↙ UNAVAILABLE FOR ORDER

PURCHASE NAVY SWEATER XYZ

↓

SECOND SEARCH REQUEST
SEARCH CRITERIA | CUT AND SEW   LARGE |

↓

SEARCH RESULT PAGE
| SEARCH RESULTS FOR "CUT AND SEW   LARGE   NAVY"<br>SEARCH RESULTS FOR "CUT AND SEW   LARGE" |

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2014/081566 filed Nov. 28, 2014, the contents of which are incorporated herein by reference in their entirety.

TECHNICAL FIELD

The present invention relates to a field of technology for searching for web pages for items that match search criteria specified by a user.

BACKGROUND ART

A conventional e-commerce website includes, for example, web pages that carry a variety of information about items for sale. A user requests a search for items having desired attributes by specifying search criteria. An e-commerce system searches for items that match the specified search criteria and causes a terminal device to display web pages for retrieved items (e.g., Patent Literature 1).

CITATION LIST

Patent Literature

Patent Literature 1: JP 2002-92507 A

SUMMARY OF INVENTION

Technical Problem

In such a system, information about an item that has different variations in attributes, such as size and color, can be displayed on one web page. However, although a user reaches such a web page by searching for items, an item with attributes desired by the user may sometimes be unavailable for order, whereas an item without the attributes desired by the user is available for order.

In view of the above point, it is an object of the present invention to provide an information processing apparatus, an information processing method, and an information processing program that can retrieve, when information about a plurality of items have different attribute combinations is carried on one web page, only web pages for items that have an attribute combination desired by a user and are also available for order.

Solution to Problem

In order to solve the above problem, the invention according to claim 1 is an information processing apparatus for generating tags used for an item search based on search criteria, the apparatus comprising: extraction means for extracting a plurality of combinations among combinations of attributes, in different attribute categories, of an item from display information indicating display details of a web page for the item, each extracted combination being associated with available/unavailable information indicating whether the item having the combination is available for order; and control means for storing, for each combination of attributes available for order among the plurality of combinations of attributes extracted by the extraction means, a tag indicating the combination and corresponding to search criteria of a logical AND of a plurality of attributes constituting the combination, in association with item identification information identifying the item in tag storage means, and for deleting, when a tag indicating a combination of attributes unavailable for order is stored in association with the item identification information in the tag storage means, the tag.

According to this invention, the information processing apparatus stores tags indicating only attribute combinations available for order among a plurality of attribute combinations that can be displayed on one web page, in association with the item identification information of an item on the web page, in tag storage means. The information processing apparatus deletes, when a tag indicating an attribute combination unavailable for order is stored in association with the item identification information of the item in the tag storage means, the tag from the tag storage means. For example, when attributes in a plurality of attribute categories are specified, a device that performs a search process searches the tag storage means based on search criteria of the logical AND of the attributes. This allows only pieces of item identification information of items having an attribute combination available for order to be retrieved. Thus, only web pages for items that have an attribute combination desired by a user and are available for order can be retrieved.

The invention according to claim 2 is the information processing apparatus according to claim 1, further comprising second extraction means for extracting, when no combination of attributes associated with the available/unavailable information is extracted by the extraction means, one combination of attributes, in different attribute categories, of the item from the display information, wherein the control means stores a tag indicating the combination of attributes extracted by the second extraction means in the tag storage means, only when the item is available for order.

A web page for an item may correspond to one attribute combination. In this case, the combination is usually not associated with available/unavailable information, and the available/unavailable information is associated with only item identification information. According to this invention, even if such a web page exists, only web pages for items that have an attribute combination desired by a user and are available for order can be retrieved by searching the tag storage means.

The invention according to claim 3 is the information processing apparatus according to claim 1 or 2, further comprising: identifying means for identifying, after a web page for a search item indicated by item identification information associated with a tag retrieved from the tag storage means based on a first search request including a first attribute specified as search criteria is displayed, when a second search request including any second attribute in the same attribute category as an attribute category of the first attribute is received with the search item being not yet purchased, a third attribute other than the first attribute from an combination unavailable for order among a plurality of combinations of attributes of the search item including the first attribute, the retrieved tag indicating a combination including the first attribute as an attribute; and search means for searching the tag storage means for pieces of item identification information associated with tags indicating a combination of the second attribute and the third attribute identified by the identifying means.

On a web page displayed after a search based on the first search request including the first attribute, an item having a combination including the first attribute and the third attribute may be unavailable for order. Although a user has not ordered the item on this web page, if the combination including the first attribute and the third attribute were available for order, the user might order the combination. According to this invention, items having an attribute that a user has not specified as search criteria in the first search request but may desire can be retrieved when the second search request is received.

The invention according to claim 4 is the information processing apparatus according to claim 3, wherein the search means searches for pieces of item identification information associated with tags indicating a combination of the second attribute and the third attribute, when a commonality between a first item category, of items to be searched for, identified based on the first search request and a second item category, of items to be searched for, identified based on the second search request meets a predetermined criterion, and the search means searches for pieces of item identification information associated with tags indicating a combination including the second attribute, when the commonality does not meet the predetermined criterion.

Attributes desired by a user may be different depending on item categories. According to this invention, based on the commonality of the item categories identified based on the search requests, whether the third attribute that a user has not specified as search criteria in the first search request is an attribute that the user may desire can be determined properly.

The invention according to claim 5 is the information processing apparatus according to claim 3 or 4, wherein the search means searches for pieces of item identification information associated with tags indicating a combination of the second attribute and the third attribute, both when a third search request has been received after the search based on the first search request and before receipt of the second search request and when an item having the third attribute has been ordered among items retrieved based on the third search request, and the search means searches for pieces of item identification information associated with tags indicating a combination including the second attribute, when no item having the third attribute has been ordered.

The attributes of an item that has been retrieved based on the third search request after the first search request and been ordered may be probability desired by a user. According to this invention, based on the attributes of the item ordered, whether the third attribute that the user has not specified as search criteria in the first search request is an attribute that the user may desire can be determined properly.

The invention according to claim 6 is the information processing apparatus according to any one of claims 1 to 5, further comprising: first search means for searching, when a plurality of terms specified as search criteria include no attribute term indicating an item attribute, display information storage means storing pieces of display information indicating display details of web pages for items and pieces of item identification information identifying items in association with each other for pieces of item identification information of items available for order among pieces of item identification information associated with pieces of display information including the plurality of terms; and second search means for searching, when the plurality of terms include one or more attribute terms indicating item attributes, for pieces of item identification information associated with tags indicating combinations including the item attributes identified by the one or more attribute terms, among pieces of item identification information associated with pieces of display information including terms other than the one or more attribute terms in the plurality of terms.

According to this invention, whether or not the plurality of terms include any attribute term, the information processing apparatus can perform a proper search. That is, when the plurality of terms do not include any attribute term, the information processing apparatus searches for items each meeting both conditions that its display information includes the plurality of terms and that it is available for order. On the other hand, when the plurality of terms include attribute term(s), the information processing apparatus searches for items each meeting both conditions that its display information includes the remaining term(s) in the plurality of terms and that a tag indicates combinations including the attribute(s) indicated by the attribute term(s).

The invention according to claim 7 is an information processing method performed by a computer for generating tags used for an item search based on search criteria, the method comprising: an extraction step of extracting a plurality of combinations among combinations of attributes, in different attribute categories, of an item from display information indicating display details of a web page for the item, each extracted combination being associated with available/unavailable information indicating whether the item having the combination is available for order; and a control step of storing, for each combination of attributes available for order among the plurality of combinations of attributes extracted in the extraction step, a tag indicating the combination and corresponding to search criteria of a logical AND of a plurality of attributes constituting the combination, in association with item identification information identifying the item in tag storage means, and of deleting, when a tag indicating a combination of attributes unavailable for order is stored in association with the item identification information in the tag storage means, the tag.

The invention according to claim 8 is an information processing program for causing a computer for generating tags used for an item search based on search criteria to function as: extraction means for extracting a plurality of combinations among combinations of attributes, in different attribute categories, of an item from display information indicating display details of a web page for the item, each extracted combination being associated with available/unavailable information indicating whether the item having the combination is available for order; and control means for storing, for each combination of attributes available for order among the plurality of combinations of attributes extracted by the extraction means, a tag indicating the combination and corresponding to search criteria of a logical AND of a plurality of attributes constituting the combination, in association with item identification information identifying the item in tag storage means, and for deleting, when a tag indicating a combination of attributes unavailable for order is stored in association with the item identification information in the tag storage means, the tag.

Advantageous Effects of Invention

According to the present invention, the information processing apparatus stores tags indicating only attribute combinations available for order among a plurality of attribute combinations that can be displayed on one web page, in association with the item identification information of an item on the web page, in tag storage means. The information processing apparatus deletes, when a tag indicating an attribute combination unavailable for order is stored in association with the item identification information of the item in the tag storage means, the tag from the tag storage means. For example, when attributes in a plurality of attribute categories are specified, a device that performs a search process searches the tag storage means based on search criteria of the logical AND of the attributes. This allows only pieces of item identification information of items having an attribute combination available for order to be retrieved. Thus, only web pages for items that have an attribute combination desired by a user and are available for order can be retrieved.

BRIEF DESCRIPTION OF DRAWINGS

FIG. 3A is a diagram showing an example of an item page for an item that has variations in combination of a plurality of attributes.

FIG. 3B is a diagram showing an example of an item page for another item that has variations in combination of a plurality of attributes.

FIG. 4A is a block diagram showing an example of a schematic configuration of an online shopping mall server 1 according to an embodiment.

FIG. 4B is a diagram showing an example of functional blocks of a system controller 14 of a online shopping mall server 1 according to an embodiment.

FIG. 5A is a diagram showing an example of information stored in a member DB 12a.

FIG. 5B is a diagram showing an example of information stored in a genre DB 12b.

FIG. 5C shows an example of information included in attribute definition information.

FIG. 5D is a diagram showing an example of information stored in an item DB 12c.

FIG. 5E is a diagram showing an example of information stored in an item page source DB 12d.

FIG. 5F is a diagram showing an example of information stored in a stock DB 12e.

FIG. 5G is a diagram showing an example of information stored in a tag DB 12f.

FIG. 5H is a diagram showing an example of information stored in a search history DB 12g.

FIG. 5I is a diagram showing an example of information stored in a browsing history DB 12h.

FIG. 5J is a diagram showing an example of information stored in an order history DB 12i.

FIG. 6A is a diagram showing an example of the attribute definition information stored in the genre DB 12b.

FIG. 6B is an example of the tags stored in the tag DB 12f.

FIG. 16 is a diagram illustrating a process of search.

DESCRIPTION OF EMBODIMENTS

Embodiments are described in detail below with reference to the drawings. The embodiments described below are embodiments in which the present invention is applied to an information processing system.

Figure 1:
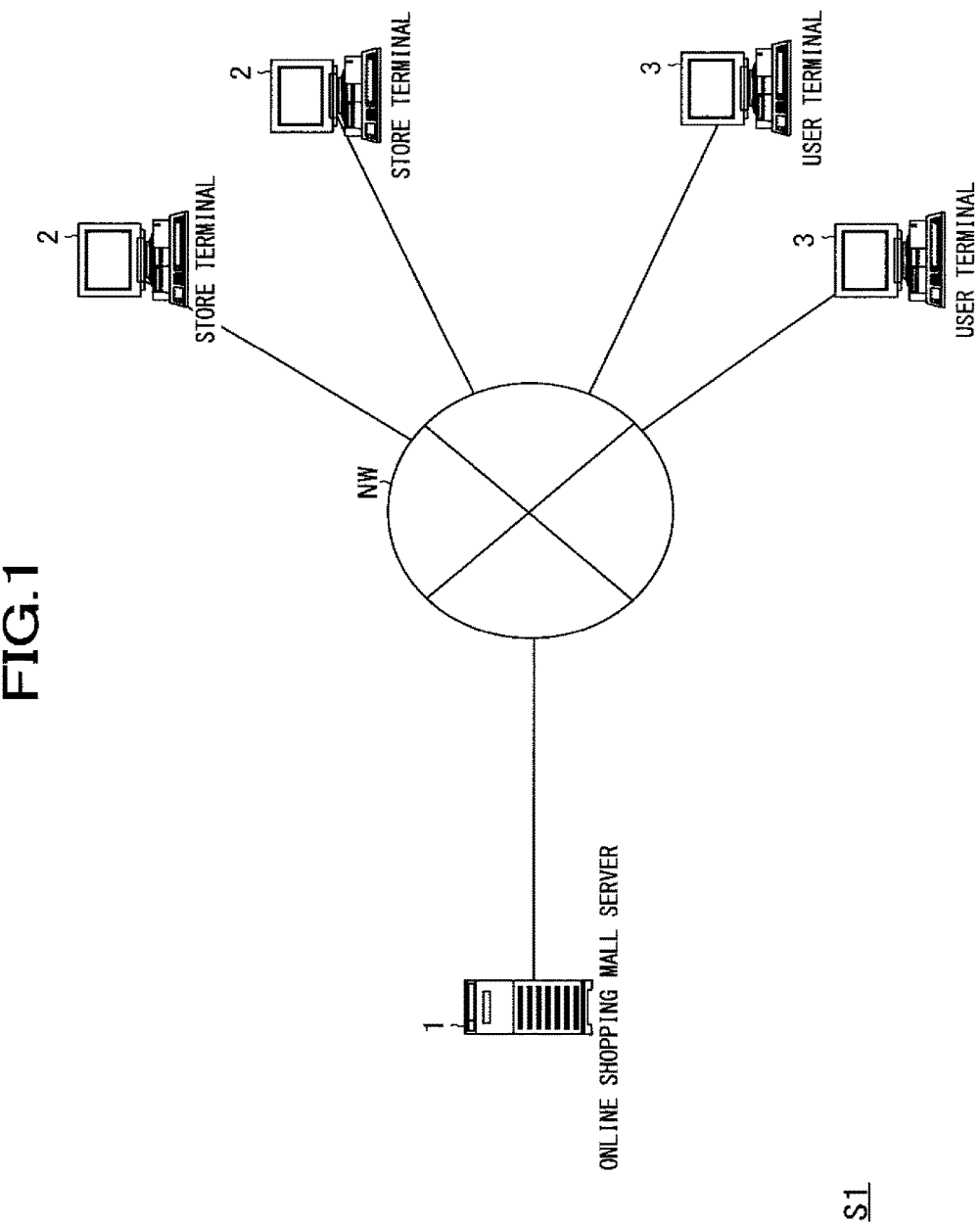
FIG. 1 is a diagram showing an example of a schematic configuration of an information processing system S according to an embodiment.

1. First Embodiment 1-1. Configuration and Functional Overview of Information Processing System First, a configuration and a functional overview of an information processing system S according to this embodiment are described with reference to FIG. 1. FIG. 1 is a diagram showing an example of a schematic configuration of the information processing system S according to this embodiment.

As shown in FIG. 1, the information processing system S includes an online shopping mall server 1, a plurality of store terminals 2, and a plurality of user terminals 3. The online shopping mall server 1 can exchange data with each store terminal 2 and each purchaser terminal 3 via a network NW using communication protocols, such as TCP/IP. The network NW includes, for example, the Internet, a dedicated communication line (e.g., community antenna television (CATV) line), a mobile communication network (including a base station), and a gateway.

The online shopping mall server 1 is a server device that performs various processes related to an online shopping mall through which items can be purchased. The online shopping mall server 1 is an example of an information processing apparatus according to the present invention. A user who uses the online shopping mall can purchase a desired item from a desired store through the online shopping mall. The online shopping mall server 1, for example, sends web pages of the online shopping mall and performs processes related to item searches, orders, and the like, in response to requests from the store terminal 2 and the user terminal 3. Websites to which the present invention can be applied are not limited to online shopping malls. The present invention may be applied to e-commerce websites through which a single store sells items, for example.

The store terminal 2 is a terminal device used by, for example, an employee of a store in the online shopping mall. The store terminal 2 accesses a server device such as the online shopping mall server 1 in response to an operation by, for example, the employee. Thus, the store terminal 2 receives a web page from the server device and displays the web page. The store terminal 2 has software, such as a browser and an e-mail client, installed on it. The employee, for example, enters information about items for sale into the online shopping mall and checks item order details by using the store terminal 2.

The user terminal 3 is a terminal device of a user who purchases items through the online shopping mall. The user terminal 3 accesses the online shopping mall server 1 in accordance with an operation by the user to receive a web page from the online shopping mall server 1 and displays the web page. The user terminal 3 has software, such as a browser and an e-mail client, installed on it. For example, a personal computer, a personal digital assistant (PDA), a portable information terminal such as a smartphone, and a mobile phone are used as the user terminal 3.

1-2. Web Page of Online Shopping Mall

Figure 2:
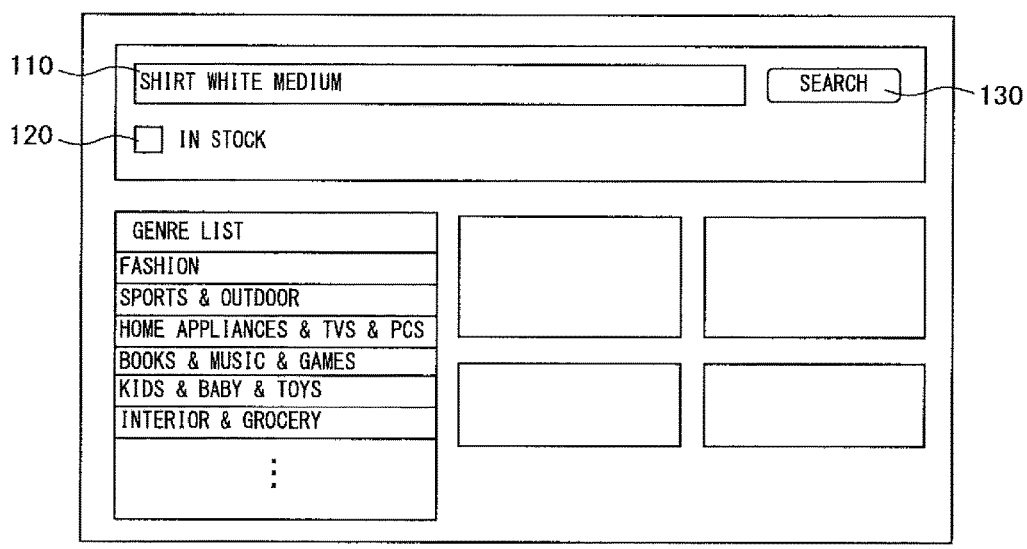
FIG. 2 is a diagram showing an example of a home page.

The following describes web pages of the online shopping mall with reference to FIGS. 2 and 3. The online shopping mall includes a variety of web pages, such as a home page, a search result page, and item pages. The home page is a web page that is at the top level of the online shopping mall. The home page is also a web page on which a user enters search criteria. The online shopping mall server 1 searches for items that match the entered search criteria. FIG. 2 is a diagram showing an example of the home page. As shown in FIG. 2, the home page includes, for example, a search term entry field 110, an available-for-order specification check box 120, and a "Search" button 130. The search term entry field 110 is an entry field for entering one or more search terms. The search terms are an example of the search criteria. A user can enter a plurality of search terms separated, for example, by a space or a comma in the search term entry field 110. The available-for-order specification check box 120 is a check box for selecting whether to request a store to search for only items available for order. Such a selection is an example of the search criteria. The items available for order are, for example, in-stock items in the store. Alternatively, the items available for order may be, for example, in-stock items in the store and/or items that the store can obtain from their maker or the like. The available-for-order specification check box 120 may be absent. In this case, the online shopping mall server 1 may always search for, for example, only items available for order. The "Search" button 130 is a button for requesting the online shopping mall server 1 to search for items using the entered search criteria. On the home page, for example, an item genre may be specified as search criteria. The item genre is an example of an item category of the present invention.

The online shopping mall server 1 performs a search for items and then sends a search result page to the user terminal 3. The search result page displays the results of the search for items. Specifically, the search result page displays a list of the items that match the search criteria.

When the user selects any of the items from search result page, the online shopping mall server 1 sends an item page to the user terminal 3. The item page displays detailed information about the selected item. The item page may be designed or created by a store. The item page displays detailed information of the item, such as the name of the item, image(s) of the item, an item ID, a price, a description of the item. Some item pages display information about item attributes. Each item typically has a plurality of attributes that belong to attribute categories different from each other. Each attribute is indicated by a pair of information identifying an attribute category and an attribute value. The information identifying an attribute category may be, for example, an attribute name. The attribute name is the name of the attribute category. Some items each have different variations that are partly different from each other in combination of a plurality of attributes. Such a plurality of items can be regarded as the same item, regardless of the difference in combination of some of the attributes. Example attribute categories of attributes that cause variations include size, color, design, material, capacity, weight, and processing power. One web page can include information about attribute combinations that such items, regarded as the same item, each have. For example, in association with the attribute combination that each of the items has, information indicating whether the attribute combination is available for order can be included. In this case, one web page includes information indicating whether each attribute combination is available for order. Such a web page may be designed so that a user can select an item to order, for example, by selecting a combination of a plurality of attributes.

FIG. 3A is a diagram showing an example of an item page for an item that has variations in combination of a plurality of attributes. The item page displays an "Add to Cart" button 210 in addition to detailed information about the item. The "Add to Cart" button 210 is a button for adding the item to a shopping cart to place an order for the item afterward. The item page may display, for example, a table 220. The table 220 indicates whether each combination of attributes in a plurality of attribute categories is available for order. For example, each heading cell of the table 220 shows a term indicating an attribute value. Specifically, each heading cell in the first row shows one or more terms indicating attribute value(s) in an attribute category, and each heading cell in the first column shows one or more terms indicating attribute value(s) in another attribute category. A term indicating an attribute value is referred to as an attribute value term. In some cases, based on an attribute value term, an attribute corresponding to the attribute value term can be identified. The attribute value term is an example of an attribute term of the present invention. Each cell other than the heading cells shows information indicating whether a combination of the attributes indicated by the attribute value terms corresponding to a pair of the row and column of the cell is available for order. For example, a cell corresponding to an attribute combination available for order may show a radio button. This radio button is a button for selecting the corresponding attribute combination. After selecting a desired attribute combination, a user selects the "Add to Cart" button 210 to add an item having the selected attribute combination to a shopping cart by operating the radio button. The user can then order the item added to the shopping cart. A cell corresponding to an attribute combination unavailable for order may show information indicating that the attribute combination is unavailable for order. For example, a symbol or a character such as "X" may be shown. The information indicating availability for order may be shown, for example, based on stock information. This stock information is information that can identify whether an item having an attribute combination is available for order. The stock information is an example of available/unavailable information of the present invention.

The web page shown in FIG. 3A displays information about a shirt ABC as an item. The table 220 shows whether each combination of attributes in the attribute categories, size and color, of the shirt is available for order. The table 220 on this web page shows "navy", "black", and "white" as color attribute value terms in the cells in the first row and "small", "medium", and "large" as size attribute value terms in the cells in the first column. The combinations "navy, small", "navy, medium", "black, small", "black, medium", "black, large", and "white, small" are available for order. On the other hand, the combinations "navy, large", "white, medium", and "white, large" are unavailable for order.

In this embodiment, combinations of attributes in two attribute categories are described for convenience. However, for example, whether combinations of attributes in three or more attribute categories are available for order may be shown in a table. For example, a plurality of tables may be alternatively displayed in accordance with a user's operation of tabs. In this case, the third attribute category is associated with the tabs. Alternatively, for example, a plurality of tables may be displayed on a web page. In this case, the third attribute category is associated with the tables. The attribute categories that the present invention can be applied to are not limited to only color and size. The items that the present invention can be applied to are not limited to clothes.

Other elements than tables may show information indicating whether each combination of attributes in a plurality of attribute categories is available for order. FIG. 3B is a diagram showing an example of an item page for another item that has variations in combination of a plurality of attributes. The web page shown in FIG. 3B displays information about a shirt DEF as an item. The web page shown in FIG. 3B displays the "Add to Cart" button 210, and drop-down lists 230 and 240. The drop-down list 230 is a drop-down list for selecting a size, for example, from among medium and large. Large is currently being selected. The drop-down list 240 is a drop-down list for selecting a color, for example, from among navy, black, and white. Black or white is about to be selected. Among large-sized ones, the navy one is unavailable for order. The item page may be designed so as to allow a user to select only combinations available for order from among a plurality of size and color combinations using the drop-down lists 230 and 240. Alternatively, the web page may be designed so as not to allow a user to select the "Add to Cart" button when the user selects a size and color combination unavailable for order. In the case of the web page shown in FIG. 3B, only the combinations "black, large" and "white, large", for example, are available for order. Increasing the number of drop-down lists can show information about combinations of attributes in three or more attribute categories.

The methods for showing information about combinations of attributes in a plurality of attribute categories are not limited to tables and drop-down lists. The number of combinations of attributes in a plurality of attribute categories has only to be more than one. Thus, for example, some attribute categories may have only one selectable attribute, and the remaining attribute category(ies) may have a plurality of selectable attributes. For example, assume that only white can be selected from color and that medium or large can be selected from size. In this case, the number of attribute combinations are two.

For example, a web page for an item that has variations in combination of attributes in a plurality of attribute categories may be designed so that information about combinations of the attributes in the attribute categories is always displayed on one web page. Alternatively, for example, web pages may be designed so that information about each attribute combination is separately displayed on an individual web page. In this case, each web page displays information about an attribute combination corresponding to the web page. For example, such a web page may display attribute values indicating an attribute combination or display an attribute name and an attribute value term in association with each other for each attribute category. In this case, the web page may display no information indicating availability for order. Alternatively, for an item that has variations in attribute combination, a store may sell only one combination. In this case, the one web page may display attribute value terms indicating the one combination or display an attribute name and an attribute value in association with each other for each attribute category. Also in this case, the web page may display no information indicating availability for order.

The items sold through the online shopping mall may or may not include an item that has no variations in combination of attributes in a plurality of attribute categories. A web page for an item that has no variations displays no information about combinations of attributes in a plurality of attribute categories.

1-3. Configuration of Online Shopping Mall Server

The following describes a configuration of the online shopping mall server 1 with reference to FIGS. 4 and 5. FIG. 4A is a block diagram showing an example of a schematic configuration of the online shopping mall server 1 according to this embodiment. As shown in FIG. 4A, the online shopping mall server 1 includes a communication unit 11, a storage unit 12, an input/output interface 13, and a system controller 14. The system controller 14 and the input/output interface 13 are connected via a system bus 15.

The communication unit 11 connects to the network NW and controls the state of communications with the store terminal 2, the user terminal 3, and the like.

The storage unit 12 includes, for example, a hard disk drive. The storage unit 12 is an example of each of available/unavailable information storage means, tag storage means, and display information storage means of the present invention. In this storage unit 12, a member DB 12a, a genre DB 12b, an item DB 12c, an item page source DB 12d, a stock DB 12e, a tag DB 12f, a search history DB 12g, a browsing history DB 12h, an order history DB 12i, and other databases have been created. "DB" is an abbreviation for "database".

FIG. 5A is a diagram showing an example of information stored in the member DB 12a. The member DB 12a stores member information about users who have signed up for the online shopping mall. Specifically, the member DB 12a stores user attributes, such as a user ID, a password, a nickname, a name, a birth date, a gender, a zip code, an address, a telephone number, an e-mail address, and credit card information, in association with each user.

FIG. 5B is a diagram showing an example of information stored in the genre DB 12b. The genre DB 12b stores genre information about item genres. Specifically, the genre DB 12b stores genre attributes, such as a genre ID, a genre name, a genre level, a parent genre ID, a child genre ID list, and attribute definition information, in association with each genre. The genre information is set, for example, by an administrator of the online shopping mall.

The item genres are hierarchically defined to have a tree structure. Specifically, each node of the tree structure corresponds to a genre. The depth of a node corresponds to the level (layer) of the genre corresponding to the node. The depth of a node is the distance from the node at the root (hereinafter simply the "root node"). The larger the value of the level is, the deeper the depth of the node is. The smaller the value of the level is, the shallower the depth of the node is. Genres corresponding to child nodes that the root node has are Level 1 genres. The Level 1 genres are the top level genres. In each of the Level 1 genres, genres corresponding to its child nodes are defined as Level 2 genres. Here, a genre J2 corresponding to a child node of a genre J1 is referred to as a "child genre" of the genre J1. The genre J1 here is referred to as the "parent genre" of the genre J2. Child genres are a plurality of subgenres into which a parent genre is further divided and are each a range to which similar items belong. Thus, the child genres belong to the parent genre. A genre corresponding to an ancestor node of a genre is referred to as an "ancestor genre". For example, assume that a genre J3 is a child genre of the genre J2. In this case, the genres J1 and J2 are each an ancestor genre of the genre J3. The items in the genre J3 not only belong to the genre J3, but also belong to the ancestor genres of the genre J3. Thus, the items in the genre J3 belongs to all of the genres J1 to J3. A genre corresponding to a descendant node of a genre is referred to as a "descendant genre". The genres J2 and J3 are descendant genres of the genre J1.

The genre ID is identification information of the genre defined by the genre information. The parent genre ID is the genre ID of the parent genre of the genre defined by the genre information. The child genre ID list is a list of the child genres of the genre defined by the genre information. The child genre ID list is set when the genre defined by the genre information has child genres.

FIG. 5C shows an example of information included in the attribute definition information. The attribute definition information is information defining an attribute that at least some of the items in the genre identified by the genre ID can have. Attribute definition information is registered for each of the attribute categories of attributes that items can have. Specifically, the attribute definition information includes, for example, an attribute name and attribute value information. The attribute value information is information defining attribute values that items can have in the attribute category identified by the attribute name. For example, the attribute value terms of a plurality of attribute values that the items can have may be listed in the attribute value information. For example, for an attribute value expressed by a numeral value, the attribute value information may include character(s) indicating a unit. For example, for the attribute category "storage capacity", the attribute value information may include characters such as "Byte" or "byte". When the attribute definition information stored in association with a genre can define the attributes of all descendant genres of the genre, attribute definition information for the descendant genres may or may not be stored in the genre DB 12b.

FIG. 5D is a diagram showing an example of information stored in the item DB 12c. The item DB 12c stores item information about items sold through the online shopping mall. The item information includes information entered by stores. Specifically, the item DB 12c stores, as the item information, a store ID, an item ID, an product code, a genre ID, an item name, and other information, in association with each of the items sold by the stores. The store ID indicates a store that sells the item. The item ID is identification information of the item and is used for the store to manage the item for sale. The item ID is an example of item identification information of the present invention. The product code is a code number identifying the item. When a plurality of stores sell the same items, each of the items is given the same product code. Examples of the product code include a Japanese article number code (JAN code). The genre ID indicates the genre to which the item belongs. The genre ID set in the item information is basically the genre ID of a genre at the bottom of the hierarchy, that is, the genre ID of the most detailed genre. The item name is a name that the store gave the item.

FIG. 5E is a diagram showing an example of information stored in the item page source DB 12d. The item page source DB 12d stores information about item pages. Specifically, the item page source DB 12d stores an item ID, item page source information, the uniform resource locator (URL) of an item page, and other information in association with each other. The item ID indicates an item corresponding to the item page. The item page source information is information indicating, for example, display details and a layout of the item page. The item page source information is used to display the item page. For example, the item page source information may include a hypertext markup language (HTML) document and an extensible markup language (XML) document. When the URL of an item page is received from the user terminal 3, the system controller 14 sends item page source information corresponding to the URL to the user terminal 3. The user terminal 3 displays the item page on its display based on the received item page source information. The item page source information is an example of display information of the present invention.

FIG. 5F is a diagram showing an example of information stored in the stock DB 12e. The stock DB 12e stores stock information indicating whether each item is available for order.

The stock DB 12e stores, as the stock information, a stock ID, an item ID, a stock status, and other information in association with each other. The item ID indicates an item whose availability for order is indicated by the stock status. The stock status indicates whether the item is available for order. For example, the stock status may be set to "available for order" or "unavailable for order". Alternatively, for example, the stock status may be set to "in stock" or "out of stock". It is available for order when the stock status is "in stock", and it is unavailable for order when the stock status is "out of stock". Alternatively, for example, the stock status may be set to the number of stocks. It is available for order when the stock status is set to 1 or greater as the number of stocks, and it is unavailable for order when the stock status is set to 0. The stock status may be changed, for example, in accordance with a change operation by a store employee. Alternatively, the online shopping mall server 1 may update the stock status, for example, in accordance with an order request or a cancel request from the user terminal 3.

For an item that has variations in attribute combination and for which information about the attribute combinations is displayed on one item page, stock information is stored for each attribute combination. One item ID is assigned to one item page. Thus, the same item ID is associated with each piece of stock information here. On the other hand, for an item that has variations in attribute combination but for which the attribute combinations are displayed on different item pages, one piece of stock information is stored for each item page. In this case, the item ID is different for each piece of stock information. Also for an item that has no variations, one piece of stock information is stored.

FIG. 5G is a diagram showing an example of information stored in the tag DB 12f. The tag DB 12f stores tags used to search for items based on search criteria specified by a user. The tags are generated by the online shopping mall server 1. Specifically, the tag DB 12f stores, for each tag, an item ID and the tag in association with each other. The tag indicates an attribute combination available for order among a plurality of attribute combinations that the item identified by the item ID has FIG. 5H is a diagram showing an example of information stored in the search history DB 12g. The search history DB 12g stores histories of searches performed by the online shopping mall server 1. Specifically, the search history DB 12g stores, as a log of a search, a user ID, a search date and time, search criteria, and other information in associated with each other. The user ID indicates the user who requested the search. The search date and time indicates the date and time at which the search was performed. The search criteria are the criteria entered by the user.

FIG. 5I is a diagram showing an example of information stored in the browsing history DB 12h. The browsing history DB 12h stores item page browsing histories of users. Specifically, the browsing history DB 12h stores, as a browsing log, a user ID, an item ID, a browsing date and time, and other information in association with each other. The user ID indicates a user who browsed an item page. The item ID indicate the item corresponding to the browsed item page. The browsing date and time indicates the date and time at which the item page was browsed.

FIG. 5J is a diagram showing an example of information stored in the order history DB 12i. The order history DB 12i stores item order histories of users. Specifically, the order history DB 12i stores, as an order log, a user ID, an item ID, an order date and time, a plurality of item attributes, and other information in association with each other. The user ID indicates a user who ordered an item. The item ID indicates the item ordered. The order date and time indicates the date and time at which the item was ordered. The item attributes indicate the attributes that the item ordered has. Specifically, when an item is added to a shopping cart, for example, on an item page as shown in FIG. 3A or 3B, the system controller 14 stores, for each of the attributes constituting the attribute combination selected by a user, an item attribute in the order history DB 12i. The system controller 14 may concatenate the item name and the attribute value term with a predetermined symbol or character therebetween to generate the item attribute. In this embodiment, the search history DB 12g, the browsing history DB 12h, and order history DB 12i are not indispensable.

The following describes other information stored in the storage unit 12. The storage unit 12 stores various data, such as hypertext markup language (HTML) documents, extensible markup language (XML) documents, image data, text data, and electronic documents, for displaying web pages. The storage unit 12 also stores various setting values.

The storage unit 12 also stores various programs, such as an operating system, a World Wide Web (WWW) server program, a database management system (DBMS), and an e-commerce control program. The e-commerce control program is a program for performing processes related to e-commerce in the online shopping mall. The various programs, for example, may be acquired from another server device or the like via the network NW, or may be recorded in a recording medium, such as a magnetic tape, an optical disk, or a memory card, and be read via a drive device. The e-commerce control program and other programs may be program products.

The input/output interface 13 performs interface processing between the communication unit 11 and the storage unit 12, and the system controller 14.

The system controller 14 includes, for example, a central processing unit (CPU) 14a, a read only memory (ROM) 14b, and a random access memory (RAM) 14c. The CPU 14a is an example of a processor. The present invention can also be applied to various processors other than CPUs. The storage unit 12, the ROM 14b, and the RAM 14c are each an example of a memory. The present invention can also be applied to various memories other than hard disks, ROMs, and RAMs.

The online shopping mall server 1 may include a plurality of server devices. For example, a server device that handles orders for items through the online shopping mall, a server device that sends web pages in response to requests from the store terminal 2 and the user terminal 3, a server device that generates tags, a server device that searches for tags, a server device that manages databases, and other server devices may be connected to each other via a LAN or the like.

1-4. Functional Overview of System Controller

The following describes a functional overview of the system controller 14 with reference to FIGS. 4B and 6A to 7. FIG. 4B is a diagram showing an example of functional blocks of the system controller 14 of the online shopping mall server 1 according to this embodiment. As shown in FIG. 4B, programs such as the e-commerce management program, read and executed by the CPU 14a, enable the system controller 14 to function as, for example, an attribute extractor 141, a tag registration unit 142, and a search unit 143. The attribute extractor 141 is an example of extraction means and second extraction means of present invention. The tag registration unit 142 is an example of control means of the present invention. The search unit 143 is an example of identifying means, search means, first search means, and second search means of the present invention.

As described above, in the online shopping mall, for an item that has variations in attribute combination, information about the attribute combinations can be displayed on one item page. In this case, on a conventional item page which is displayed by a user's specifying search criteria, performing a search, and selecting from the results of the search, an item with attributes desired by the user may sometimes be unavailable for order, whereas an item without the attributes desired by the user is available for order. This problem is specifically described below.

Assume that a user enters a plurality of search terms that include the common name of an item desired by the user and two or more terms indicating item attribute values desired by the user in the search term entry field 110 on the home page. The user also specifies a search for items available for order using the available-for-order specification check box 120. When search criteria are thus entered, a conventional information processing apparatus performs a full-text search based on the entered search terms. That is, the conventional information processing apparatus searches for pieces of item page source information that include all of the entered search terms. Then, the conventional information processing apparatus searches for items available for order, among items whose item page source information has been retrieved, based on the stock statuses stored in the stock DB 12e. For an item that has variations in attribute combination, a stock status is stored for each attribute combination in the stock DB 12e. That is, a plurality of stock statuses are stored for one item page. For such an item, if at least one of the stock statuses each of which is stored for the corresponding attribute combination indicates that it is available for order, the conventional information processing apparatus determines that the item is available for order. Consequently, although an item having an attribute combination indicated by the attribute value terms entered by the user is unavailable for order, a web page for the item may be retrieved.

For example, assume that a user enters the search terms "shirt white medium". "White" is a color attribute value, and "medium" is a size attribute value. "Shirt", "white", and "medium" are each displayed on the web page shown in FIG. 3A. The shirt ABC of white color and medium size is unavailable for order. However, other combinations such as the shirt ABC of navy color and small size are available for order. Consequently, the web page shown in FIG. 3A is retrieved.

Thus, the system controller 14 stores, for only an attribute combination available for order, a tag that indicates the combination and also corresponds to search criteria of the logical AND of a plurality of attributes constituting the combination, in association with the item ID in the tag DB 12f. When a plurality of search terms including terms indicating attribute values are entered as search criteria, the system controller 14 searches for item IDs associated with tags including all of the attributes indicated by the entered attribute values. Thus, only item pages for items that have an attribute combination desired by a user and are also available for order can be retrieved. Specific functions of the attribute extractor 141, the tag registration unit 142, and the search unit 143 to achieve this will be described.

The attribute extractor 141 identifies, based on item page source information, a plurality of combinations whose stock statuses each indicate whether the item having the combination is available for order and are stored in the stock DB 12e, among combinations of a plurality of attributes selected from a plurality of respective attribute categories.

For example, the attribute extractor 141 first searches for stock IDs from the item page source information. An item page displays information indicating availability for order based on stock statuses. Specifically, the item page source information describes, for each attribute combination, the stock ID of the stock status corresponding to the combination in association with the combination. For example, the user terminal 3 displays information indicating availability for order by referring to the stock status corresponding to the stock ID in accordance with codes, a script or a program described in the item page source information. For example, the user terminal 3 displays the table 220 shown in FIG. 3A or the drop-down lists 230 and 240 shown in FIG. 3B.

When stock IDs are found in the item page source information, the attribute extractor 141 extracts, for each stock ID, the attribute combination associated with stock ID from the item page source information. For example, when a table shows availability for order as shown in FIG. 3A, the attribute extractor 141 extracts attribute value terms from the description sections such as the heading cells for the cell describing the stock ID. Thus, an attribute value term set is extracted from the heading cells in the first row and another attribute value term set is extracted from the heading cells in the first column, for example. The attribute extractor 141 also retrieves, from the genre DB 12b, the attribute definition information corresponding to an item genre corresponding to the item page source information. The attribute extractor 141 identifies, for example for each of the extracted attribute value term sets, the attribute category of the attribute value term set by comparing the attribute value term set with attribute value information in the attribute definition information. For example, assume that not less than a predetermined percentage of the attribute value terms included among attribute value terms in the set are identical to any of the attribute value terms included in the attribute value information. In this case, the attribute extractor 141 may obtain the attribute name included in the attribute definition information as information identifying the attribute category of the attribute value term set. A plurality of candidates for the attribute category of the attribute value term set may be found. In that case, for example, the attribute extractor 141 may further search the item page source information for an attribute name. Then, the attribute extractor 141 may identify, from among the candidates, an attribute category whose attribute name has been found as the attribute category of the attribute value term set. When the attribute value terms include a number, for example, the attribute extractor 141 may determine whether the attribute value terms include a term indicating a unit, or further search the item page source information for a term indicating a unit or an attribute name. Then, the attribute extractor 141 may identify the attribute category corresponding to the attribute value term set based on this determination result or search result.

For example, when drop-down lists show availability for order as shown in FIG. 3B, the attribute extractor 141 can extract a plurality of attribute value term sets shown in the lists and a plurality of stock IDs in association with each other, from the description sections of the drop-down lists. Typically, the attribute name of an attribute category corresponding to an attribute value term set is described in or near the description section of a drop-down list. Thus, the attribute extractor 141 can extract attribute combinations based on these pieces of information.

The attribute extractor 141 may concatenate, for example for each of the attributes extracted from the item page source information, the item name and the attribute value term with a predetermined symbol or character therebetween to generate an item attribute. Then, the attribute extractor 141 identifies, for each of the attribute combinations extracted from the item page source information, an item attribute combination corresponding to the combination.

For example, an item page may be designed so that a desired attribute can be selected from among a plurality of attributes only in one attribute category. For example, assume that an item page includes a table with one row and three columns except for the heading row and column and that this table shows "navy", "black", and "white" in the heading cells in the first row and nothing in the heading cells in the first column. In this case, only color attributes can be identified from the table. The attribute extractor 141 may extract attributes in another attribute category, for example, from the item page source information. For example, when the item page displays "This item is designed with polka dots", the attribute extractor 141 may extract a design of polka dots as an attribute. In this case, the attribute extractor 141 may extract the combinations "navy, polka dots", "black, polka dots", and "white, polka dots".

For example, there may be item page source information that has no stock ID described in it. The item page in this case may display information about only an item with one specific attribute combination. Thus, the extractor 141 may or may not extract one attribute combination from such item page source information independently of any stock ID.

When the attribute extractor 141 extracts a plurality of attribute combinations from one piece of item page source information, the tag registration unit 142 refers, for each combination, to the stock status corresponding to the stock ID associated with the combination. Then, the tag registration unit 142 stores, for each combination available for order among the extracted combinations, a tag that indicates the combination and also corresponds to search criteria of the logical AND of attributes constituting the combination in association with the item ID of the corresponding item, in the tag DB 12f. The item ID of the corresponding item is the item ID associated with the item page source information from which the attribute combinations have been extracted. On the other hand, the tag registration unit 142 does not store a tag indicating a combination unavailable for order in the tag DB 12f. If a tag indicating a combination unavailable for order is stored in association with the item ID of the corresponding item in the tag DB 12f, the tag registration unit 142 deletes the tag from the tag DB 12f.

For example, the tag registration unit 142 may concatenate a plurality of item attributes corresponding to a combination available for order with a predetermined symbol or character indicating the logical AND therebetween to generate a tag. The tag registration unit 142 stores, in the tag DB 12f, the generated tag in association with the item ID of the item page source information.

The following gives specific examples of how to extract attributes and how to register tags. FIG. 6A is a diagram showing an example of the attribute definition information stored in the genre DB 12b, for the genre "tops". As shown in FIG. 6A, the attribute definition information with the attribute name "color" and the attribute definition information with the attribute name "size" are registered. "White", "black", "navy", and "red", for example, are registered as attribute value terms for "color". "Small", "medium", "large", and "extra large", for example, are registered as attribute value terms for "size".

FIG. 6B is an example of the tags stored in the tag DB 12f, for the item page shown in FIGS. 3A and 3B. The extractor 141 extracts, as attribute value sets associated with stock IDs, the set "navy", "black", and "white", and the set "small", "medium", and "large" from the source information of the item page shown in the FIG. 3A. The extractor 141 determines that "navy", "black", and "white" are color attribute value terms and that "small", "medium", and "large" are size attribute value terms, based on the attribute definition information stored in the genre DB 12b. Then, the extractor 141 extracts the combinations "navy, small", "navy, medium", "navy, large", "black, small", "black, medium", "black, large", "white, small", "white, medium", and "white, large" based on the rows and columns of cells describing the stock IDs.

Among these combinations, the combinations available for order are "navy, small", "navy, medium", "black, small", "black, medium", "black, large", and "white, small". Thus, the tag registration unit 142 stores, for example, the tags "color=navy*size=small", "color=navy*size=medium", "color=black*size=small", "color=black*size=medium", "color=black*size=large", and "color=white*size=small" in association with the item ID of the shirt ABC, in the tag DB 12f. "*" indicates the logical AND.

The tag registration unit 142 does not cause the tags "color=navy*size=large", "color=white*size=medium", and "color=white*size=large" to be stored. If these tags are already stored in the tag DB 12f, the tag registration unit 142 deletes these tags from the tag DB 12f.

The extractor 141 extracts, for example, the set "navy", "black", and "white", and the set "medium" and "large", as sets of the attribute values associated with the stock IDs, from the source information of the item page shown in the FIG. 3B.

Among these combinations, the combinations available for order are "black, large" and "white, large". Thus, the tag registration unit 142 stores, for example, the tags "color=black*size=large" and "color=white*size=large" in association with the item ID of the shirt DEF, in the tag DB 12f. The tag registration unit 142 does not cause tags corresponding to the other combinations to be stored.

In this embodiment, a tag including attribute names and attribute value terms is generated. However, the tag registration unit 142 may generate, for example, a tag including only the attribute value terms, among the attribute names and the attribute value terms. For example, the tags "navy*small" and "navy*medium" may be generated.

When only one attribute combination is extracted from the item page source information independently of any stock ID, the tag registration unit 142 may or may not store a tag indicating the combination in the tag DB 12f.

The search unit 143 searches for pieces of item page source information or searches for both pieces of item page source information and tags based on the search criteria entered by a user. For example, assume that the user specifies a search for items available for order using the available-for-order specification check box 120. In this case, the search unit 143 identifies attribute value term(s) and terms that do not indicate any attribute value, for example, from a plurality of search terms entered by the user. A term that does not indicate any attribute value term is referred to as a non-attribute value term. When the search terms do not include any attribute value term, the search unit 143 searches the item page source DB 12d for item IDs each of which corresponds to item page source information including all of the search terms and also corresponds to a stock status indicating that it is available for order. When the search terms include one or more attribute value terms, the search unit 143 searches for item IDs each of which corresponds to item page source information including non-attribute value term(s) in the search terms and also corresponds to tags indicating combinations including the attribute(s) identified by the attribute value term(s) .ding the attribute(s) identified by the attribute value term(s).

Examples of how to identify attribute value term(s) and non-attribute term(s) will be described. The search unit 143 may determine, for example, the first search term among the search terms as a non-attribute term. The search unit 143 may determine whether the first search term is a genre name, for example, based on the genre DB 12b. When the first search term is identical or similar to a genre name, the genre ID corresponding to the genre name is identified. Similar terms may include, for example, synonyms and terms having similar meanings. The search unit 143 may determine whether each of the second search term and the following search term(s) is an attribute value term, for example, based on the attribute definition information corresponding to the identified genre ID. For example, when the search term is identical or similar to any of the attribute value terms included in the attribute value information in the attribute definition information, the search unit 143 may determine that the search term is an attribute value term. When the search term is not identical or similar to any attribute value term included in the attribute value information in the attribute definition information, the search unit 143 may determine that the search term is a non-attribute term. When the first search term is not identical or similar to any genre name, the search unit 143 may determine that all the search terms are non-attribute value terms, for example.

Alternatively, the search unit 143 may extract a search term identical or similar to a genre name, for example, from the search terms. Then, the search unit 143 determines that the search term identical or similar to a genre name as a non-attribute term and identifies the genre ID corresponding to the genre name. The search unit 143 may determine whether each of the other search terms is an attribute value term, for example, based on the attribute definition information corresponding to the identified genre ID.

The search unit 143 concatenates, for each of the extracted attribute value terms, the corresponding attribute name and the attribute value term with a predetermined symbol or character therebetween to generate attribute criteria. Then, the search unit 143 searches the tag DB 12f for tags that include at least all of the generated one or more attribute criteria.

Figure 7:
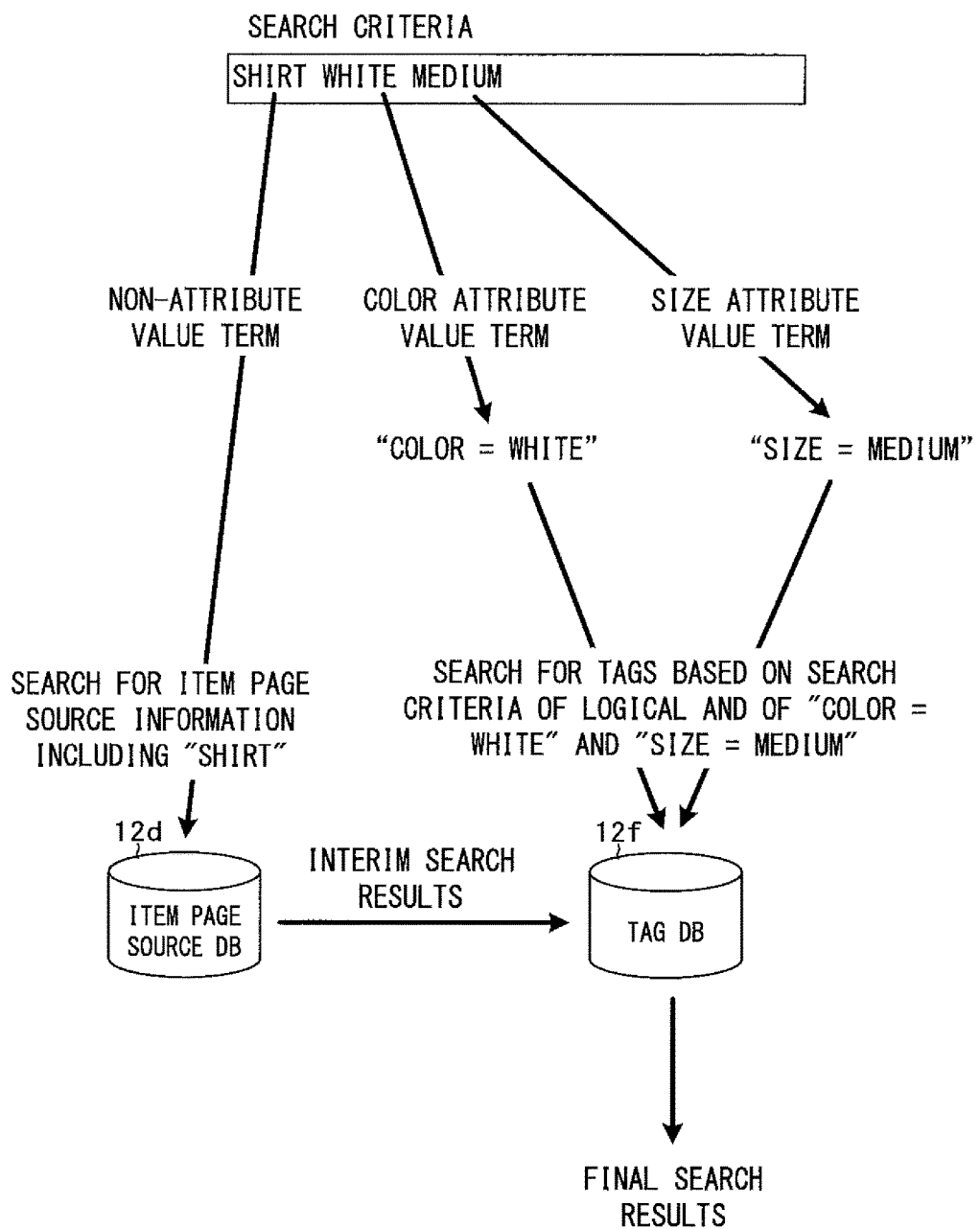
FIG. 7 is a diagram illustrating a process for performing a search.

The following shows a specific example of the search. FIG. 7 is a diagram illustrating a process for performing a search. Assume that a user enters the search terms "shirt white medium" and specifies searching for items available for order, as shown in FIG. 7. Assume that "shirt" is stored as the genre name of one of the descendant genres of "tops" in the genre DB 12*b*. Thus, the search unit 143 determines that the search term "shirt" is a genre name and a non-attribute value term. The search unit 143 also determines that the search term "white" is a color attribute value term and that the search term "medium" is a size attribute value term, based on the attribute definition information of "tops".

The search unit 143 searches the item page source DB 12*d* for pieces of item page source information that include, for example, the non-attribute term "shirt" in the search terms and obtains the item IDs corresponding to the retrieved pieces of item page source information as interim search results.

The search unit 143 also concatenates each attribute value term and its attribute name to generate, for example, the attribute criteria "color=white" and "size=medium". The search unit 143 searches for tags that match search criteria of the logical AND of "color=white" and "size=medium" from among the tags stored in association with the item IDs obtained as the interim search results in the tag DB 12*f*. That is, the search unit 143 searches for tags that includes both "color=white" and "size=medium". Then, the search unit 143 obtains the item IDs corresponding to the retrieved tags as the final search results.

The search unit 143 may, for example, first search for tags that match one or more attribute criteria, and then obtain the corresponding item IDs as interim search results. Then, the search unit 143 may retrieve pieces of item page source information that correspond to the item IDs obtained as the interim search results and also include non-attribute value term(s), and obtain the corresponding item IDs as final search results.

In this embodiment, item attribute criteria are entered as search terms. However, for examples, the home page may include a tag search term entry field for entering terms to search for tags separately from a search term entry field for entering search terms used for a full-text search. In this case, the search unit 143 determines term(s) entered in the search term entry field as non-attribute value term(s), and determines term(s) entered in the tag search term entry field as attribute value term(s). Then, the search unit 143 identifies attribute name(s) corresponding to the attribute value term(s) and generates attribute criteria. Also for example, the home page may display an element for specifying one or more attributes as search criteria. In this case, the home page may be designed so that attribute category and attribute value combination(s) can be specified. In this case, the search unit 143 generates attribute criteria corresponding to the specified combination(s).

In this embodiment, attribute criteria include attribute name(s) and attribute value term(s). However, when the tags stored in the tag DB 12*f* include, among attribute names and attribute value terms, only the attribute value terms, the attribute criteria may include only attribute value terms.

The attribute extractor 141 and the tag registration unit 142 may be included in a device other than a server device including the search unit 143. In this case, the device including the attribute extractor 141 and the tag registration unit 142 is an example of an information processing apparatus according to the present invention. The device including the attribute extractor 141 and the tag registration unit 142 may be, for example, a server device or a terminal device.

1-5. Operation of Information Processing System

Figure 8:
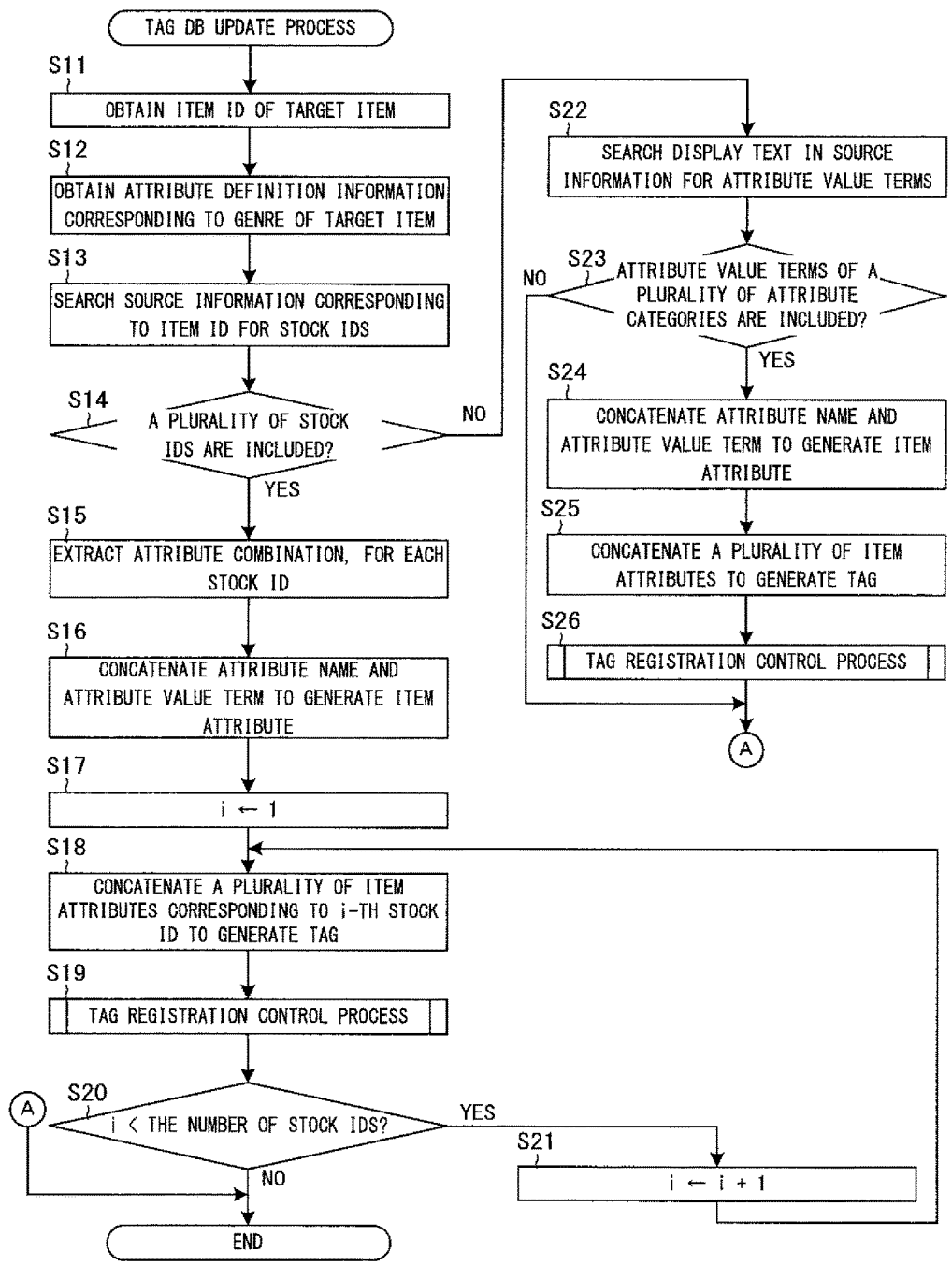
FIG. 8 is a flowchart showing an example of a tag DB update process in the online shopping mall server 1 according to an embodiment.
Figure 11:
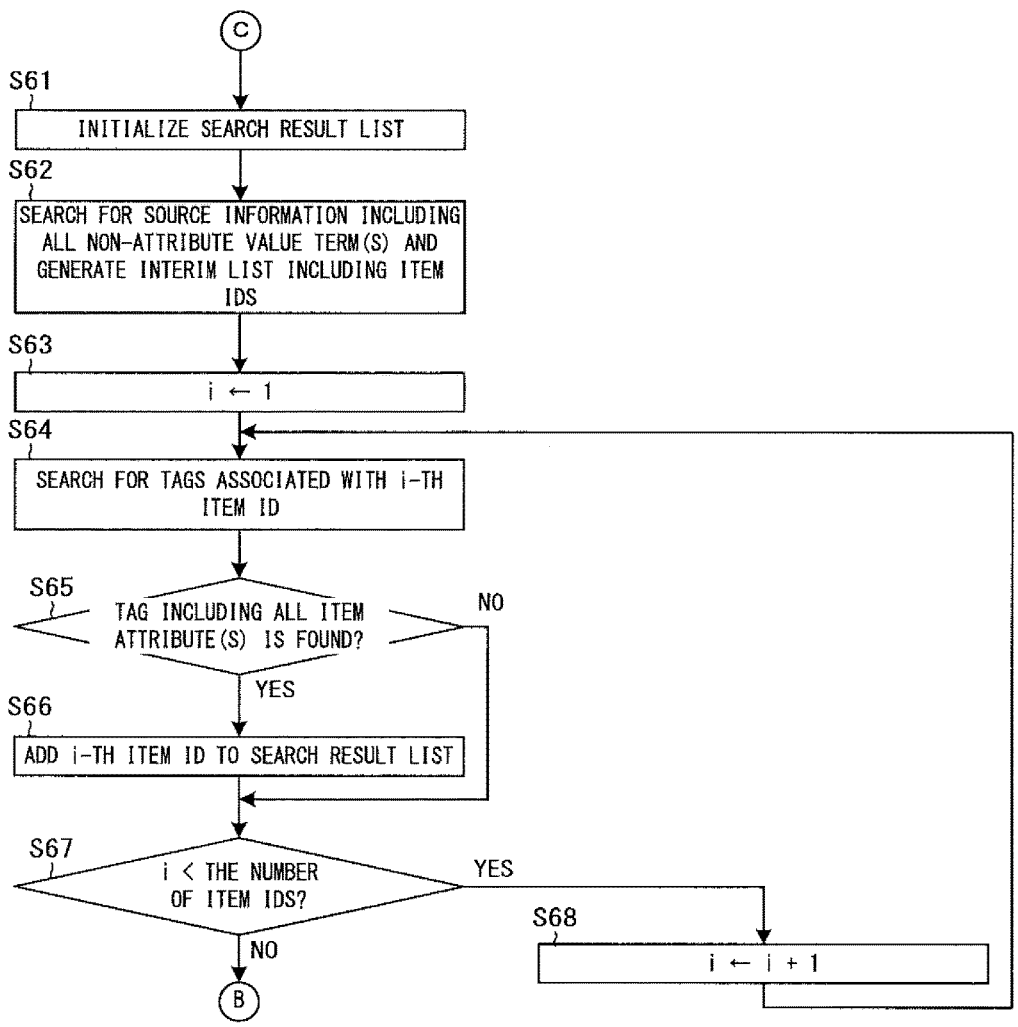
FIG. 11 is a flowchart showing an example of the search process in the online shopping mall server 1 according to an embodiment.

The following describes an operation of the information processing system S with reference to FIGS. 8 and 11.

FIG. 8 is a flowchart showing an example of a tag DB update process in the online shopping mall server 1 according to this embodiment. The tag DB update process is a process for updating the tag DB 12*f*. For example, the system controller 14 may perform the tag DB update process for all the items at predetermined intervals. Also for example, when any stock status stored in the stock DB 12*e* has been updated, the system controller 14 may perform the tag DB update process only for the item corresponding to the stock status.

As shown in FIG. 8, the tag registration unit 142 obtains the item ID of a target item (Step S11). Subsequently, the attribute extractor 141 obtains attribute definition information (Step S12). Specifically, the attribute extractor 141 retrieves the genre ID corresponding to the item ID of the target item from the item DB 12*c*. Next, the attribute extractor 141 retrieves the attribute definition information corresponding to the retrieved genre ID from the genre DB 12*b*. When the corresponding attribute definition information is not stored, the attribute extractor 141 identifies the genre ID of an ancestor genre of the genre indicated by the genre ID of the target item, based on the parent genre IDs stored in the genre DB 12*b*. Then, the attribute extractor 141 obtains the attribute definition information corresponding to the identified genre ID.

Subsequently, the attribute extractor 141 searches for the item page source information stored in association with the item ID of the target item in the item page source DB 12*d* for stock IDs (Step S13). Then, the attribute extractor 141 determines whether the item page source information includes a plurality of stock IDs, as a result of the search (Step S14). Here, if the attribute extractor 141 determines that the item page source information includes a plurality of stock IDs (YES in Step S14), the process proceeds to Step S15. On the other hand, if the attribute extractor 141 determines that the item page source information does not include a plurality of stock IDs (NO in Step S14), the process proceeds to Step S22.

In Step S15, the attribute extractor 141 extracts, for each of the retrieved stock IDs, an attribute combination associated with the stock ID from the item page source information, based on the attribute definition information. Specifically, the attribute extractor 141 extracts attribute value terms associated with the stock ID, and obtains the attribute names corresponding to the attribute value terms from the attribute definition information. Subsequently, the attribute extractor 141 concatenates, for each of the extracted attributes, the attribute name and the attribute value term to generate an item attribute (Step S16).

After that, the tag registration unit 142 sets a variable i to 1 (Step S17). Then, the tag registration unit 142 concatenates item attributes corresponding to a combination of the attributes associated with the i-th stock ID among the stock IDs to generate a tag (Step S18). At this time, the tag registration unit 142 determines the order of the item attributes included in the tag, in accordance with a predetermined criterion. For example, the tag registration unit 142 may concatenate the item attributes in ascending order of character code values of the character strings of the item attributes. Next, the tag registration unit 142 performs a tag registration control process (Step S19).

Figure 9:
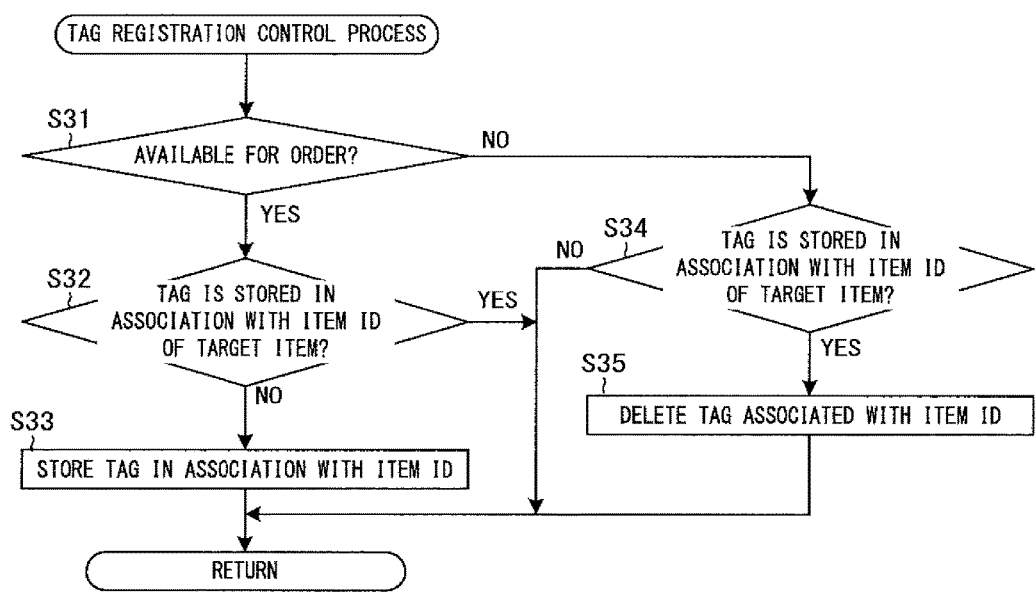
FIG. 9 is a flowchart showing an example of a tag registration control process in the online shopping mall server 1 according to an embodiment.

FIG. 9 is a flowchart showing an example of the tag registration control process in the online shopping mall server 1 according to this embodiment. As shown in FIG. 9, the tag registration unit 142 retrieves the stock status corresponding to the i-th stock ID from the stock DB 12*e*. Then, the tag registration unit 142 determines whether the stock status indicates that it is available for order (Step S31). Here, if the tag registration unit 142 determines that the retrieved stock status indicates that it is available for order (YES in Step S31), the process proceeds to Step S32. On the other hand, if the tag registration unit 142 determines that the stock status does not indicate that it is available for order (NO in Step S31), the process proceeds to Step S34.

In Step S32, the tag registration unit 142 determines whether the generated tag is stored in association with the item ID of the target item in the tag DB 12f. Here, if the tag registration unit 142 determines that the generated tag is stored in association with the item ID of the target item (YES in Step S32), the tag registration unit 142 terminates the tag registration control process. On the other hand, if the tag registration unit 142 determines that the generated tag is not stored in association with the item ID of the target item (NO in Step S32), the process proceeds to Step S33. In Step S33, the tag registration unit 142 stores the generated tag in association with the item ID of the target item in the tag DB 12f. Then, the tag registration unit 142 terminates the tag registration control process.

In Step S34, the tag registration unit 142 determines whether the generated tag is stored in association with the item ID of the target item in the tag DB 12f. Here, if the tag registration unit 142 determines that the generated tag is stored in association with the item ID of the target item (YES in Step S34), the process proceeds to Step S35. In Step S35, the tag registration unit 142 deletes, from the tag DB 12f, the tag that is stored in association with the item ID of the target item and is also identical to the generated tag. Then, the tag registration unit 142 terminates the tag registration control process. On the other hand, if the tag registration unit 142 determines that the generated tag is not stored in association with the item ID of the target item (NO in Step S34), the tag registration unit 142 terminates the tag registration control process.

When the tag registration control process ends, the tag registration unit 142 determines whether the variable i is less than the number of the retrieved stock IDs (Step S20). Here, if the tag registration unit 142 determines that the variable i is less than the number of the stock IDs (YES in Step S20), the process proceeds to Step S21. In Step S21, the tag registration unit 142 adds 1 to the variable i, and the process proceeds to Step S18. On the other hand, if the tag registration unit 142 determines that the variable i is not less than the number of the stock IDs (NO in Step S20), the tag registration unit 142 terminates the tag DB update process.

In Step S22, the attribute extractor 141 searches the text, which is to be displayed on the item page, in the item page source information of the target item for attribute value terms in a plurality of attribute categories, based on the attribute definition information. Subsequently, the attribute extractor 141 determines whether the item page source information includes attribute value terms in a plurality of attribute categories, as a result of the search (Step S23). Here, if the attribute extractor 141 determines that the item page source information includes attribute value terms in a plurality of attribute categories (YES in Step S23), the process proceeds to Step S24. On the other hand, if the attribute extractor 141 determines that the item page source information does not include attribute value terms in a plurality of attribute categories (NO in Step S23), the attribute extractor 141 terminates the tag DB update process.

In Step S24, the attribute extractor 141 concatenates, for each of the extracted attribute values, the attribute name and the attribute value term to generate an item attribute. Then, the tag registration unit 142 concatenates the item attributes to generate a tag (Step S25). Next, the attribute extractor 141 performs the tag registration control process (Step S26). Thus, the tag registration unit 142 stores the generated tag in the tag DB 12f or deletes the generated tag from the tag DB 12f. Then, the tag registration unit 142 terminates the tag DB update process.

Figure 10:
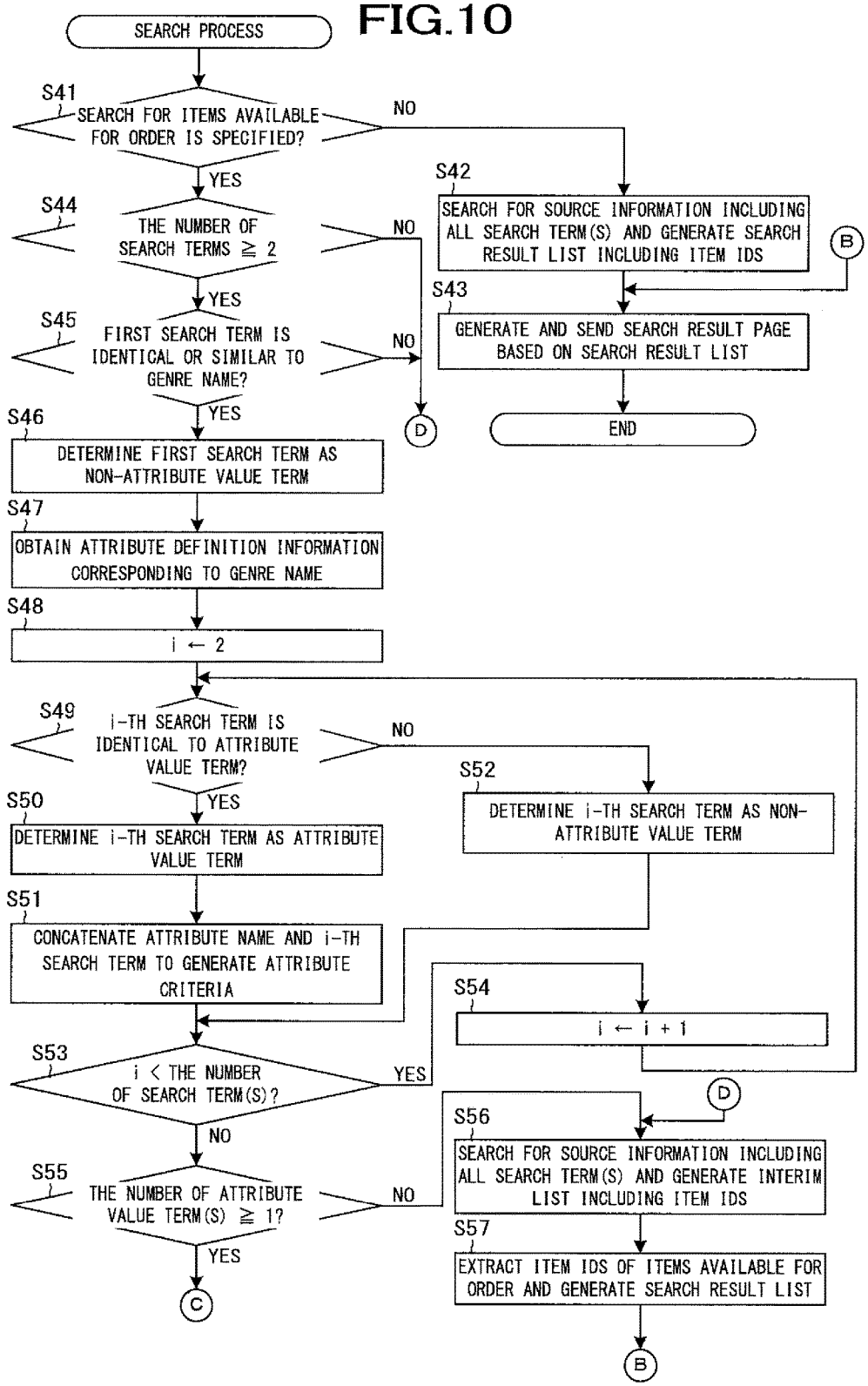
FIG. 10 is a flowchart showing an example of a search process in the online shopping mall server 1 according to an embodiment.

FIGS. 10 and 11 is a flowchart showing an example of a search process in the online shopping mall server 1 according to this embodiment. A user enters one or more search terms on the home page and selects whether to specify a search for items available for order. When the user selects the "Search" button 130, the user terminal 3 sends a search request to the online shopping mall server 1. The search request includes, for example, the user ID of the user who requested the search and search criteria. The search criteria includes the entered search terms and the result of selecting whether to specify a search for items available for order. When the online shopping mall server 1 receives the search request from the user terminal 3, the system controller 14 performs the search process.

As shown in FIG. 10, the search unit 143 determines whether a search for items available for order is specified, based on the search criteria included in the search request (Step S41). Here, if the search unit 143 determines that a search for items available for order is specified (YES in Step S41), the process proceeds to Step S44. On the other hand, if the search unit 143 determines that a search for items available for order is not specified (NO in Step S41), the process proceeds to Step S42.

In Step S42, the search unit 143 searches the item page source DB 12d for pieces of item page source information that include all of the search term(s) included in the search request. Subsequently, the search unit 143 retrieves the item IDs corresponding to the retrieved pieces of item page source information from the item page source DB 12d. Then, the search unit 143 generates a search result list including the retrieved item IDs.

After that, the search unit 143 generates a search result page based on the search result list. Then, the search unit 143 sends the generated search result page to the user terminal 3 (Step S43). Specifically, the search unit 143 retrieves information about the items corresponding to the item IDs included in the search result list from the item DB 12c, and adds information about a list of the retrieved items to an HTML document of the search result page. The search unit 143 adds, based on the URLs of item pages for the retrieved items, links to the item pages to the HTML document of the search result page. Then, the search unit 143 sends the HTML document. The search unit 143 also stores a log of the search in the search history DB 12g. Specifically, the search unit 143 obtains the current date and time as the search date and time. The search unit 143 also obtains the user ID from the search request. Then, the search unit 143 generates a search log that includes the user ID, the search date and time, the search criteria, and causes the search log to be stored. After that, the search unit 143 terminate the search process.

In Step S44, the search unit 143 obtains the search term(s) included in the search request. Subsequently, the search unit 143 determines whether the number of the search term(s) is two ore greater. Here, if the search unit 143 determines that the number of the search term(s) is two or greater (YES in Step S44), the process proceeds to Step S45. On the other hand, if the search unit 143 determines that the number of the search term(s) is not two or greater (NO in Step S44), the process proceeds to Step S56.

In Step S45, the search unit 143 selects the first search term among the search term(s) obtained from the search request. Then, the search unit 143 determines whether the first search term is identical or similar to any of the genre names stored in the genre DB 12b. Here, if the search unit 143 determines that the first search term is identical or similar to any of the genre names stored in the genre DB 12b (YES in Step S45), the process proceeds to Step S46. On the other hand, if the search unit 143 determines that the first search term is not identical or similar to any of the genre names stored in the genre DB 12b (NO in Step S45), the process proceeds to Step S56.

In Step S46, the search unit 143 determines the first search term as a non-attribute value term. Subsequently, the search unit 143 obtains attribute definition information (Step S47). Specifically, the search unit 143 retrieves the genre ID corresponding to a genre name identical or similar to the first search term from the genre DB 12b. Next, the attribute extractor 141 retrieves the attribute definition information corresponding to the retrieved genre ID from the genre DB 12b. When the corresponding attribute definition information is not stored, the attribute extractor 141 identifies the genre ID of an ancestor genre of the genre indicated by the retrieved genre ID, based on the parent genre IDs stored in the genre DB 12b. Then, the attribute extractor 141 obtains the attribute definition information corresponding to the identified genre ID.

After that, the search unit 143 sets a variable i to 2 (Step S48). Subsequently, the search unit 143 selects the i-th search term among the search term(s) obtained from the search request. Then, the search unit 143 determines whether the i-th search term is identical or similar to any of the attribute value terms identified by the retrieved attribute value information. Here, if the search unit 143 determines that the search term is identical or similar to any of the attribute value terms (YES in Step S49), the process proceeds to Step S50. On the other hand, if the search unit 143 determines that the search term is not identical or similar to any of the attribute value terms (NO in Step S49), the process proceeds to Step S52.

In Step S50, the search unit 143 determines the i-th search term as an attribute value term. Next, the search unit 143 obtains the attribute name corresponding to the attribute value term identical or similar to the i-th search term from the attribute definition information. The search unit 143 concatenates the obtained attribute name and the i-th search term to generate attribute criteria (Step S51), and then the process proceeds to Step S53. In Step S52, the search unit 143 determines the i-th search term as a non-attribute value term, and the process proceeds to Step S53.

In Step S53, the search unit 143 determines whether the variable i is less than the number of the search term(s). Here, if the search unit 143 determines that the variable i is less than the number of the search term(s) (YES in Step S53), the process proceeds to Step S54. In Step S54, the search unit 143 adds 1 to the variable i, and the process proceeds to Step S49. On the other hand, if the search unit 143 determines that the variable i is not less than the number of the search term(s) (NO in Step S53), the process proceeds to Step S55.

In Step S55, the search unit 143 determines whether the number of the search term(s) determined as attribute value term(s) is one or greater (Step S55). Here, if the search unit 143 determines that the number of the search term(s) determined as attribute value term(s) is one or greater (YES in Step S55), the process proceeds to Step S61. On the other hand, if the search unit 143 determines that the number of the search term(s) determined as attribute value term(s) is not one or greater (NO in Step S55), the process proceeds to Step S56.

In Step S56, the search unit 143 searches the item page source DB 12d for pieces of item page source information that includes all of the search term(s) included in the search request. Subsequently, the search unit 143 retrieves the item IDs corresponding to the retrieved pieces of item page source information from the item page source DB 12d. Then, the search unit 143 generates an interim list including the retrieved item IDs.

Subsequently, the search unit 143 searches the interim list for item IDs of items available for order (Step S57). Specifically, the search unit 143 retrieves, for each of the item IDs included in the interim list, one or more stock statuses corresponding to the item ID from the stock DB 12e. Then, the search unit 143 determines the item IDs corresponding to one or more of the retrieved stock status(es) each of which indicates that it is available for order, as the item IDs of items available for order. Next, the search unit 143 generates a search result list including the item IDs of items available for order, and the process proceeds to Step S43.

In Step S61, the search unit 143 initializes a search result list as shown in FIG. 11. After that, the search unit 143 searches the item page source DB 12d for pieces of item page source information that includes all of the search term(s), among search terms included in the search request, determined as non-attribute value term(s). Subsequently, the search unit 143 retrieves the item IDs corresponding to the retrieved pieces of item page source information from the item page source DB 12d. Then, the search unit 143 generates an interim list including the retrieved item IDs.

After that, the search unit 143 sets the variable i to 1 (Step S63). Next, the search unit 143 selects the i-th item ID among the item IDs included in the interim list. Then, the search unit 143 searches the tag DB 12f for tags associated with the i-th item ID (Step S64). Subsequently, the search unit 143 determines whether a tag that includes at least all of the item attribute(s) indicated by the generated one or more attribute criteria is found among the retrieved tag(s) (Step S65). The item attributes identified by the attribute criteria may be, for example, item attributes that include attribute names identical to the attribute names included in the attribute criteria and also include attribute value terms identical or similar to the attribute value terms included in the attribute criteria. Here, if the search unit 143 determines that a tag that includes at least all of the item attribute(s) indicated by the one or more attribute criteria is found (YES in Step S65), the process proceeds to S66. In Step S66, the search unit 143 adds the i-th item ID to the search result list, and the process proceeds to Step S67. On the other hand, if the search unit 143 determines that a tag that includes at least all of the item attribute(s) indicated by the one or more attribute criteria is not found (NO in Step S65), the process proceeds to S67.

In Step S67, the search unit 143 determines whether the variable i is less than the number of the item IDs included in the interim list. Here, if the search unit 143 determines that the variable i is less than the number of the item IDs (YES in Step S67), the process proceeds to Step S68. In Step S68, the search unit 143 adds 1 to the variable i, and the process proceeds to Step S64. On the other hand, if the search unit 143 determines that the variable i is not less than the number of the item IDs (NO in Step S67), the process proceeds to Step S43. Then, the search unit 143 generates and sends a search result page based on the search result list. When the search log is stored in the search history DB 12g, for example, the search unit 143 may put the generated attribute criteria in the search log.

As described above, according to this embodiment, the system controller 14 extracts, from item page source information, a plurality of combinations each associated with stock information indicating whether an item having the combination is available for order, among combinations of a plurality of item attributes in different attribute categories. The system controller 14 also stores, for each extracted combination whose stock information indicates that the combination is available for order, a tag that indicates the combination and also corresponds to search criteria of the logical AND of attributes constituting the combination in association with the item ID, in the storage unit 12. On the other hand, when a tag indicating a combination whose stock information indicates that the combination is unavailable for order is stored in the storage unit 12, the system controller 14 deletes the tag. Consequently, only item pages for items that have an attribute combination desired by a user and are available for order can be retrieved.

When no combination whose stock status is stored in the storage unit 12 is extracted, the system controller 14 may extract, from the item page source information, one combination of attributes in a plurality of attribute categories. Only when the stock status stored in association with the item ID in the tag DB 12f indicates that it is available for order, the system controller 14 may store a tag indicating the extracted combination in the tag DB 12f. In this case, even if there is an item page that corresponds to only one combination, only item pages for items that have an attribute combination desired by a user and are available for order can be retrieved by searching the tag DB 12f.

When a plurality of entered search terms do not include any attribute value term, the system controller 14 may search the item page source DB 12d for items ID of items available for order, among item IDs each of which is associated with item page source information including the search terms. On the other hand, when the search terms include one or more attribute value terms indicating item attribute(s), the system controller 14 searches for item IDs each of which is associated with item page source information including non-attribute value term(s) among the search terms and is also associated with tags indicating combinations including the attributes identified by the attribute value term(s). In this case, whether or not the search terms include any attribute value term, a proper search can be performed.

2. Second Embodiment 2-1. Functional Overview of System Controller

Figure 12:
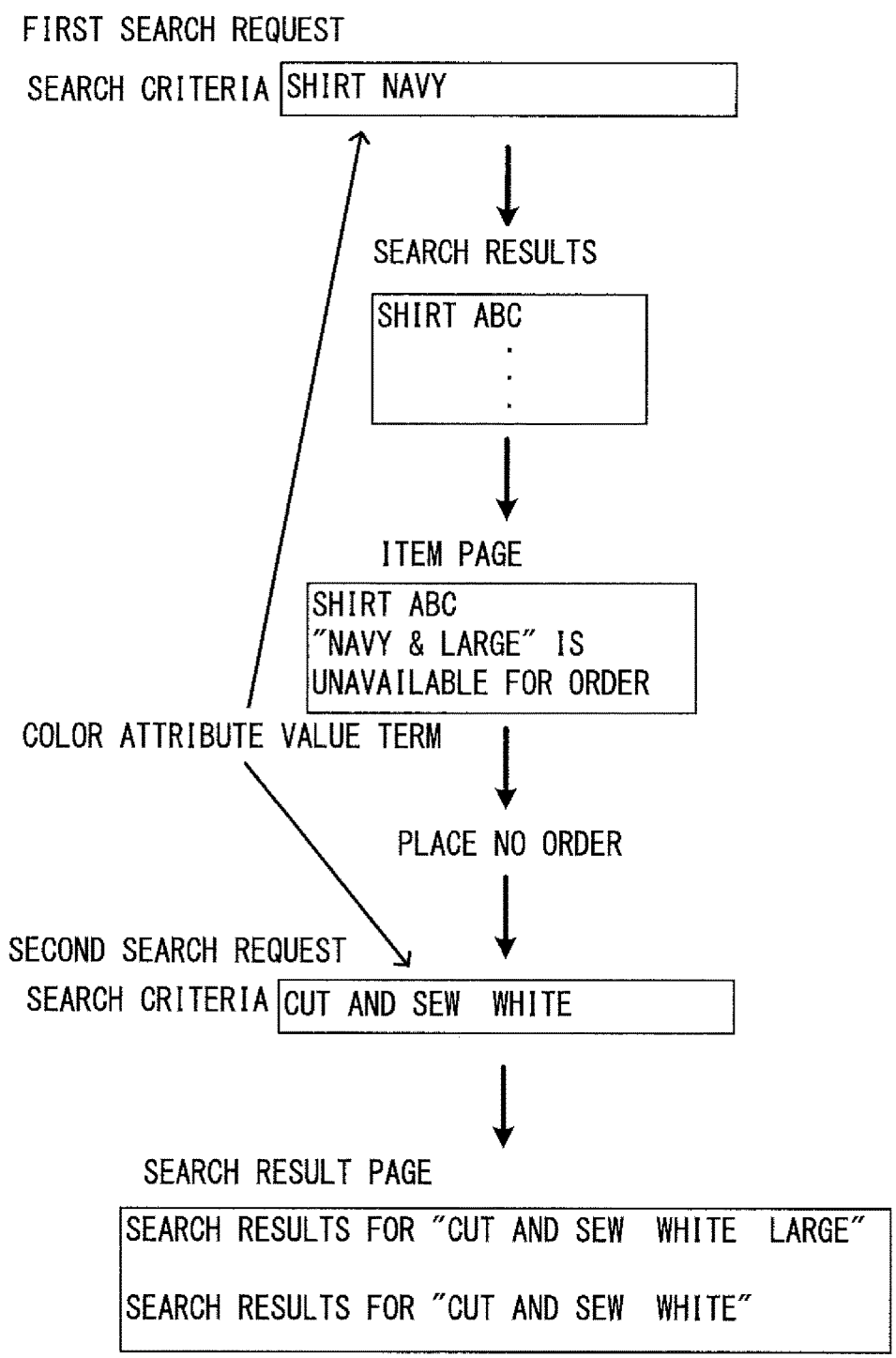
FIG. 12 is a diagram illustrating a process of search.

The following describes a functional overview of the system controller 14 according to a second embodiment with reference to FIG. 12. FIG. 12 is a diagram illustrating a process of a search. On the home page, for example, a user specifies a search for items available for order. The user also specifies, as at least part of search criteria, an attribute identical to an attribute constituting part of a combination of a plurality of attributes identified by a tag. This attribute is referred to as a first attribute. For example, assume that the search terms "shirt navy" are entered as shown in FIG. 12. In this case, "navy" corresponds to the first attribute. Then the user terminal 3 sends a search request to the online shopping mall server 1. This search request is referred to as a first search request.

When the first search request is received, the search unit 143 retrieves tags that include at least the specified first attribute, and sends a search result page to the user terminal 3 based on the item IDs corresponding to the tags. The user selects an item that has variations in attribute combination from the search results, and then the user terminal 3 displays an item page for the selected item. On the item page, at least one combination, among one or more combinations including the first attribute, is available for order. For example, assume that the user selects the shirt ABC and that the item page shown in FIG. 3A is then displayed.

Here, assume that the user does not order any item. Also assume that the user, after that, specifies a search for items available for order and specifies, as at least part of search criteria, an attribute belonging to the same attribute category as the first attribute on the home page. This attribute is referred to as a second attribute. For example, assume that the search terms "cut and sew white" are entered as shown in FIG. 12. In this case, "white" corresponds to the second attribute. Then the user terminal 3 sends a search request to the online shopping mall server 1. This search request is referred to as a second search request.

When the second search request is received, the search unit 143 identifies, among a plurality of attribute combinations of the item whose item page has been displayed, combinations including the first attribute because the attribute category of the second attribute included in the search criteria is identical to the attribute category of the first attribute. Subsequently, the search unit 143 identifies combinations that include the first attribute and are also unavailable for order, based on the stock DB 12e. Then, the search unit 143 identifies, among the combinations unavailable for order, an attribute other than the first attribute. This attribute is referred to as a third attribute. For example, "navy, large", among the combinations including "navy", is unavailable for order as shown in FIG. 3A. In this case, "large" corresponds to the third attribute.

The search unit 143 searches the tag DB 12f for item IDs associated with tags that include at least both the second attribute included in the search criteria of the second search request and the identified third attribute. For example, the search unit 143 may first search for tags including the second attribute, and then search for tags including the third attribute among the retrieved tags. The search unit 143 may generate a search result page, for example, so as to give higher priority to displaying information about the items corresponding to tags that include both the second attribute and the third attribute than to displaying information about the items corresponding to tags that include the second attribute but do not include the third attribute. For example, the information about the items corresponding to the tags that include both the second attribute and the third attribute may come before the information about the items corresponding to the tags that include the second attribute and do not include the third attribute in terms of display order. Item information in a more forward part of the display order, for example, is displayed in more visible position on the search result page, or can reduce the number of steps of switching pages required to display the search result page carrying the item information. For example, as shown in FIG. 12, search results for the search terms "cut and sew white large" are displayed higher, and search results for the search terms "cut and sew white" except for the search results for the search terms "cut and sew white large" are displayed lower on the search result page. The search unit 143 may search for, for example, only the item IDs associated with the tags including both the second attribute and the third attribute.

The reason why such searches as described above are performed will be described. In view of the first search request, the user probably wishes for an item having at least the first attribute. On an item page displayed as a result of the search based on the first search request, at least one of attribute combinations including the first attribute is available for order. The user, however, does not purchased any item having the first attribute. In view of these actions, if item(s) having combination(s) that include the first attribute and are also unavailable for order were available for order, the user might place an order. That is, the user may wish for the item having the third attribute among the combinations unavailable for order. Thus, if the second attribute belonging to the same attribute category as the first attribute is specified in a search request that the user sends without having ordered any item, the search unit 143 can determine that the user may wish for an item having both the second attribute and the third attribute. This makes it easier for user to find an item that has attributes desired by the user and are also available for order.

The search unit 143 may search for the item IDs associated with the tags including the second attribute and the third attribute, for example, only when the second attribute is identical to the first attribute.

The search unit 143 may identify, for example, the last search request as the first search request. Alternatively, the search unit 143 may identify, for example, a predetermined number of times prior search request as the first search request. Alternatively, the search unit 143 may determine, for example, the search requests from the last search request to the predetermined number of times prior search request as candidates for the first search request, and determine the first search request among the candidates. Alternatively, the search unit 143 may determine, for example, the search requests between the present and a predetermined time ago as candidates for the first search request, and determine the first search request among the candidates. Alternatively, the search unit 143 may determine, for example, the search requests between the user's last login to the online shopping mall and the present as candidates for the first search request, and determine the first search request among the candidates.

The extraction of attributes from item page source information and the generation and the registration of tags are the same as those in the first embodiment.

2-2. Operation of Information Processing System

Figure 13:
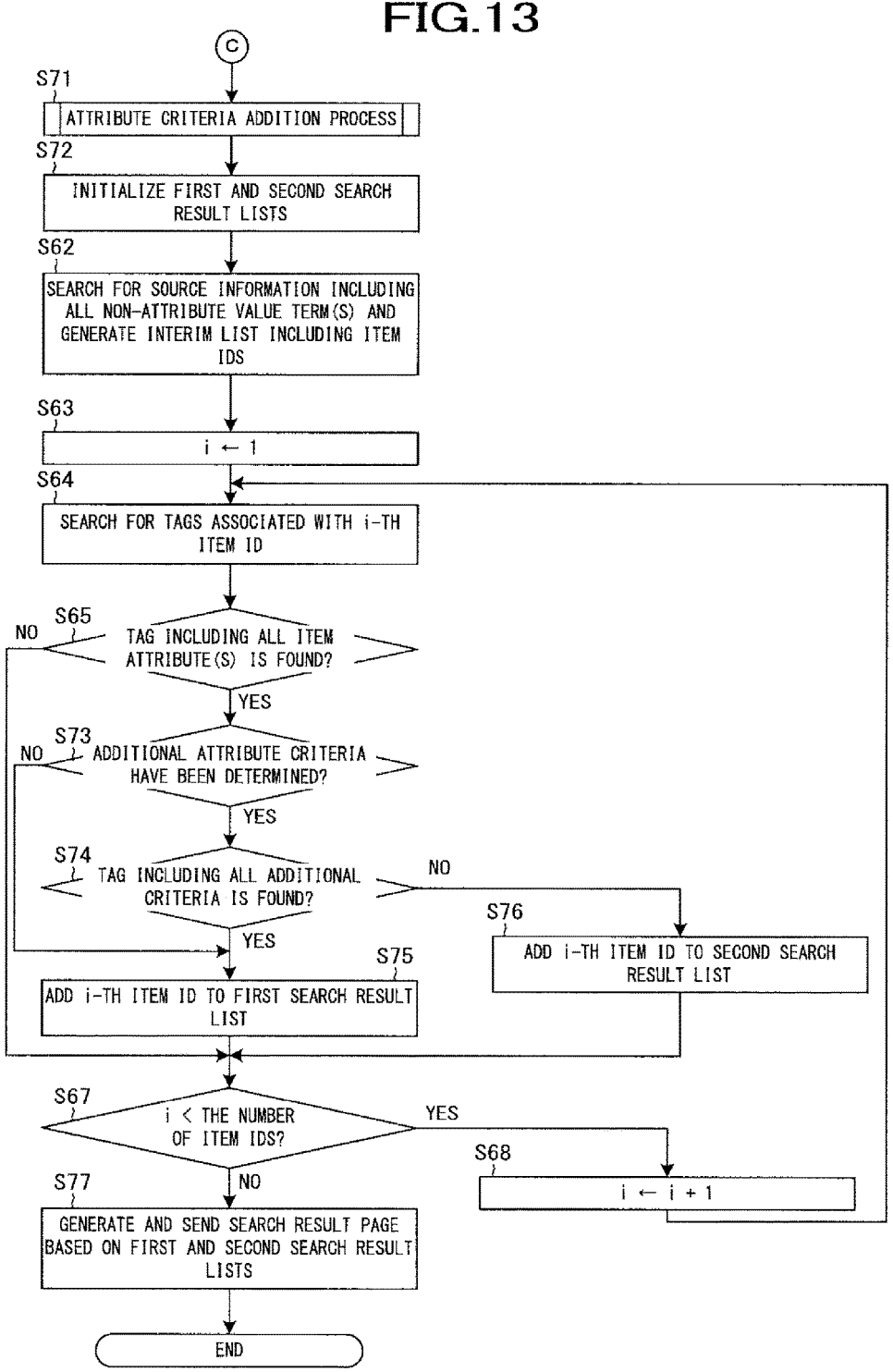
FIG. 13 is a flowchart showing an example of the search process in the online shopping mall server 1 according to an embodiment.
Figure 14:
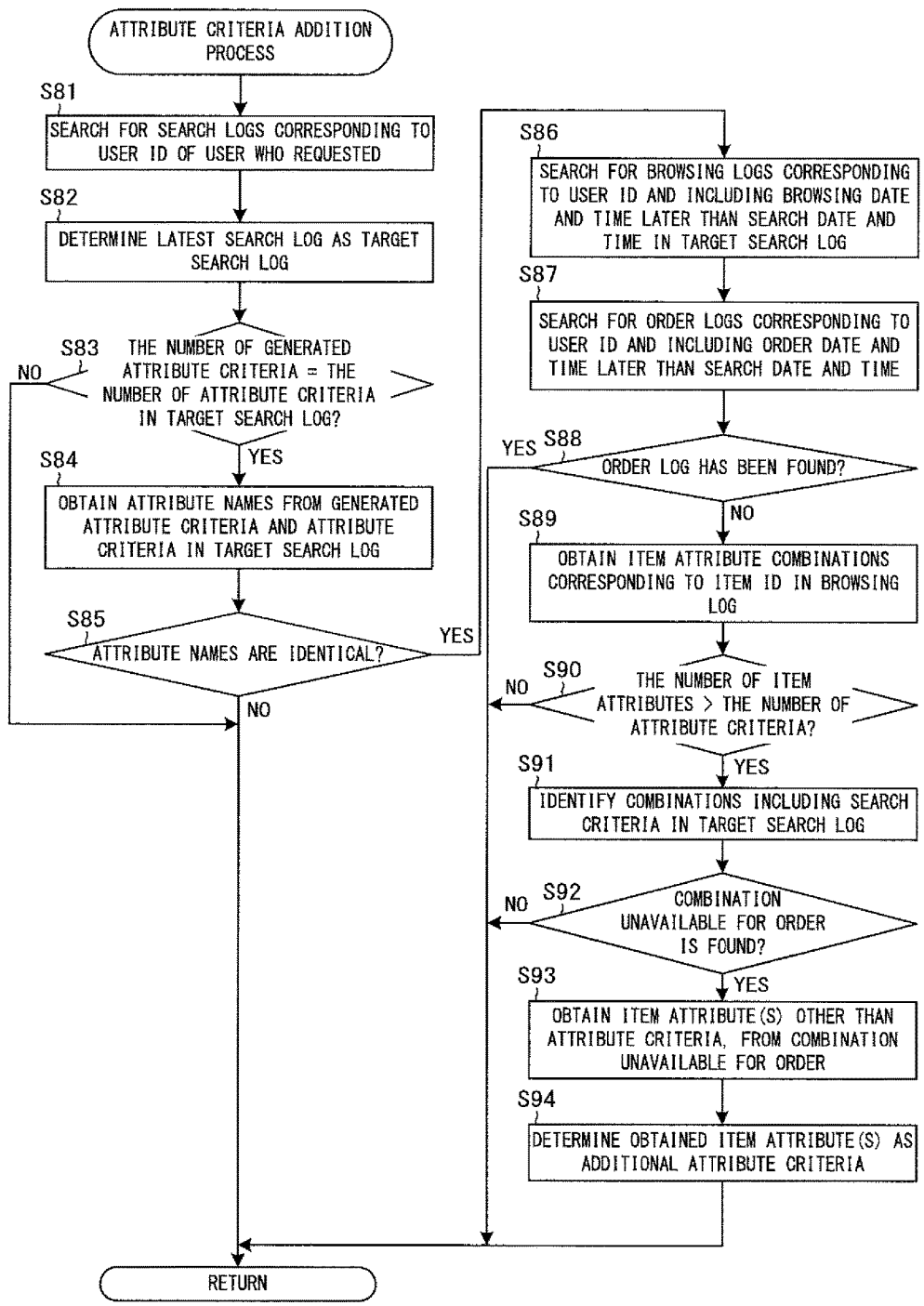
FIG. 14 is a flowchart showing an example of an attribute criteria addition process in the online shopping mall server 1 according to an embodiment.

The following describes an operation of the information processing system S with reference to FIGS. 13 and 14. FIG. 13 is a flowchart showing an example of the search process in the online shopping mall server 1 according to this embodiment. In FIG. 13, the same steps as those shown in FIG. 11 are denoted by the same reference signs. When a search result is received from the user terminal 3, the system controller 14 performs such process as shown in FIG. 10. The search request received this this time is the second search request. In Step S55, if the search unit 143 determines that the number of the search term(s) determined as attribute value term(s) is one or greater (YES in Step S55), the process proceeds to Step S71. In Step S71, the search unit 143 performs an attribute criteria addition process as shown in FIG. 13.

FIG. 14 is a flowchart showing an example of the attribute criteria addition process in the online shopping mall server 1 according to this embodiment. As shown in FIG. 14, the search unit 143 obtains the user ID of the user who requested the search from the search request. Then, the search unit 143 searches the search history DB 12g for search logs corresponding to the obtained user ID (Step S81). Subsequently, the search unit 143 determines the search log including the latest search date and time among the retrieved search logs as a target search log (Step S82). The target search log is treated as the search log corresponding to the first search request.

Next, the search unit 143 counts the number of attribute criteria included in the target search log. Then, the search unit 143 determines whether the number of attribute criteria generated based on the received search request is equal to the number of attribute criteria included in the target search log (Step S83). Here, if the search unit 143 determines that the number of the generated attribute criteria is equal to the number of attribute criteria included in the target search log (YES in Step S83), the process proceeds to Step S84. On the other hand, if the search unit 143 determines that the number of the generated attribute criteria is not equal to the number of attribute criteria included in the target search log (NO in Step S83), the search unit 143 terminates the attribute criteria addition process.

In Step S84, the search unit 143 obtains, as a first attribute name, an attribute name from each of the generated one or more attribute criteria. The search unit 143 obtains, as a second attribute name, an attribute name from each of the one or more attribute criteria included in the target search log. Then, the search unit 143 determines whether a combination of the obtained first attribute name(s) is identical to a combination of the obtained second attribute name(s) (Step S85). Here, if the search unit 143 determines that the combination of the first attribute name(s) is identical to the combination of the second attribute name(s) (YES in Step S85), the process proceeds to Step S86. In this case, the one or more attribute criteria included in the target search log correspond to the first attribute(s), and the one or more attribute criteria generated this time correspond to the second attribute(s). On the other hand, if the search unit 143 determines that the combination of the first attribute name(s) is not identical to the combination of the second attribute name(s) (NO in Step S85), the search unit 143 terminates the attribute criteria addition process.

In Step S86, the search unit 143 searches the browsing history DB 12h for browsing logs that correspond to the user ID of the user who requested the search and also include a browsing date and time later than the search date and time in the target search log. Subsequently, the search unit 143 searches the order history DB 12i for order logs that include the item ID, of the item ordered, identical to the item ID of the retrieved browsing log and an order date and time later than the browsing date and time in the retrieved browsing log, among order logs that correspond to the user ID of the user who requested the search. Then, the search unit 143 determines whether an order log meeting the above has been found (Step S88). Here, if the search unit 143 determines that an order log meeting the above has been found (YES in Step S88), the search unit 143 terminates the attribute criteria addition process. On the other hand, if the search unit 143 determines that no order log meeting the above has been found (NO in Step S88), the process proceeds to Step S89.

In Step S89, the search unit 143 obtains the item ID from the retrieved browsing log. Subsequently, the search unit 143 obtains a plurality of item attribute combinations corresponding to the item identified by the obtained item ID. For example, the search unit 143 may extract attribute combinations associated with stock IDs from the item page source information corresponding to the retrieved item. ID. Alternatively, when the attribute extractor 141 extracts stock IDs and attribute combinations from the item page source information in the tag DB update process shown in FIG. 8, item attribute combinations corresponding to the attribute combinations may be stored in association with the stock IDs in the stock DB 12e. Then, the search unit 143 may retrieve the item attribute combinations corresponding to the item ID from the stock DB 12e.

Next, the search unit 143 counts, from any of the retrieved combinations, the number of item attributes constituting the combination. Then, the search unit 143 determines whether the number of the item attributes is greater than the number of the attribute criteria included in the target search log (Step S90). Here, if the search unit 143 determines that the number of the item attributes is greater than the number of combinations of the attribute criteria (YES in Step S90), the process proceeds to Step S91. On the other hand, if the search unit 143 determines that the number of the item attributes is not greater than the number of combinations of the attribute criteria (NO in Step S90), the search unit 143 terminates the attribute criteria addition process.

In Step S91, the search unit 143 identifies, among the retrieved item attribute combinations, one or more combinations including the one or more attribute criteria included in the target search log. Subsequently, the search unit 143 retrieves the stock status(es) corresponding to the stock ID(s) associated with the identified combination(s) from the stock DB 12e. Then, the search unit 143 determines, based on the stock status(es), whether a combination unavailable for order is found among the identified combination(s) (Step S92). Here, the search unit 143 determines that a combination unavailable for order is found (YES in Step S92), the process proceeds to Step S93. On the other hand, the search unit 143 determines that no combination unavailable for order is found (NO in Step S92), the search unit 143 terminates the attribute criteria addition process.

In Step S93, the search unit 143 obtains, from the combination unavailable for order, one or more item attributes other than the attribute criteria included in the target search log. Subsequently, the search unit 143 determines the obtained item attribute(s) as additional attribute criteria (Step S94). The additional attribute criteria correspond to the third attribute(s). After that, the search unit 143 terminate the attribute criteria addition process.

When a plurality of combinations unavailable for order are found, for example, the search unit 143 may not determine any additional attribute criteria, or may determine, from any of the combinations, additional attribute criteria in accordance with a predetermined criterion.

When the attribute criteria addition process ends, the search unit 143 initializes a first search result list and a second search result list as shown in FIG. 13 (Step S72). After that, the search unit 143 performs Steps S62 to S65. In Step S65, if the search unit 143 determines that a tag that includes at least all of the item attribute(s) indicated by the one or more attribute criteria is found (YES in Step S65), the process proceeds to S73. On the other hand, if the search unit 143 determines that a tag that includes at least all of the item attribute(s) indicated by the one or more attribute criteria is not found (NO in Step S65), the process proceeds to S67.

In Step S73, the search unit 143 determines whether any additional attribute criteria have been determined in the attribute criteria addition process. Here, if the search unit 143 determines that additional attribute criteria have been determined (YES in Step S73), the process proceeds to Step S74. On the other hand, if the search unit 143 determines that no additional attribute criteria have been determined (NO in Step S73), the process proceeds to Step S75.

In Step S74, the search unit 143 determines whether a tag that includes at least all of the item attribute(s) determined as the additional attribute criteria is found among the tags that have been identified by the determination in Step S65 and also include all of the item attribute(s) indicated by the generated one more attribute criteria. Here, if the search unit 143 determines that a tag that includes at least all of the item attribute(s) determined as the additional attribute criteria is found (YES in Step S74), the process proceeds to Step S75. On the other hand, if the search unit 143 determines that a tag that includes at least all of the item attribute(s) determined as the additional attribute criteria is not found (NO in Step S74), the process proceeds to Step S76.

In Step S75, the search unit 143 adds the i-th item ID to the first search result list, and the process proceeds to Step S67. In Step S76, the search unit 143 adds the i-th item ID to the second search result list, and the process proceeds to Step S67.

In Step S67, if the search unit 143 determines that the variable i is less than the number of the item IDs (YES in Step S67), the process proceeds to Step S68. In Step S68, the search unit 143 adds 1 to the variable i, and the process proceeds to Step S64. On the other hand, if the search unit 143 determines that the variable i is not less than the number of the item IDs (NO in Step S67), the process proceeds to Step S77.

In Step S77, the search unit 143 generates a search result page based on the first search result list and the second search result list and sends the search result page to the user terminal 3. Specifically, the search unit 143 determines the display order, starting from the first to the N-th, of item information for the item IDs included in the first search result list. N is the number of the item IDs included in the first search result list. Subsequently, the search unit 143 determines the display order, starting from the (N+1)-th, of item information for the item IDs included in the second search result list. Then, the search unit 143 generates an HTML document of the search result page so as to give higher priority to displaying information about an item whose item ID is in a more forward part of the display order. Next, the search unit 143 sends the HTML document of the search result page and causes a log of the search to be stored. After that, the search unit 143 terminate the search process. When no additional attribute criteria has been determined, the second search result list includes no item IDs. Thus, the search unit 143 generates the search result page substantially based on the first search result list. The process in this case is the same as Step S43 shown in FIG. 10.

As described above, according to this embodiment, after an item page for items indicated by item IDs associated with tags that are retrieved from the tag DB 12f based on the first search request including the first attribute specified as search criteria and indicate combinations including the first attribute as a partial attribute is displayed, when the second search request including any second attribute belonging to the same attribute category as the first attribute is received with the items being not yet purchased, the system controller 14 identifies the third attribute other than the first attribute from a combination whose stock status indicates that it is unavailable for order among a plurality of attribute combinations of the items including the first attribute. The system controller 14 also searches the tag DB 12f for item IDs associated with tags that indicate a combination of the second attribute and the third attribute. Thus, items having an attribute that a user has not specified as search criteria in the first search request but may desire can be retrieved when the second search request is received.

3. Third Embodiment 3-1. Functional Overview of System Controller

The following describes a functional overview of the system controller 14 according to a third embodiment. The search unit 143 searches for tags including both the second attribute and the third attribute, as in the second embodiment. In the third embodiment, the search unit 143 identifies an item genre based on the first search request. This genre is referred to as a first genre. The search unit 143 also identifies an item genre based on the second search request. This genre is referred to as a second genre. Only when a commonality between the first genre and the second genre meets a predetermined criterion, the search unit 143 searches for item IDs associated with tags including both the second attribute and the third attribute. On the other hand, when the commonality of the genres does not meet the predetermined criterion, the search unit 143 does not search for item IDs associated with the tags including both the second attribute and the third attribute. The reason is that a user who wishes for an item having the third attribute for a genre may not wish for another item having the third attribute for a completely different genre. This embodiment can prevent items undesired by a user from being retrieved and thus making an item desired by the user less likely to be found by the user.

The predetermined criterion is, for example, that the first genre is identical to the second genre. Alternatively, the predetermined criterion may be, for example, that a genre at a predetermined reference level among the first genre and the ancestor genres of the first genre is identical to a genre at a predetermined reference level among the second genre and the ancestor genres of the second genre. The reference level for ancestor genres to be compared may be, for example, common to all genres, or be stored for each genre in the genre DB 12b. For example, for each predetermined feature about items, information that defines a plurality of genres having an identical or similar feature may be stored in the storage unit 12. The search unit 143 may determine, based on this information, that the predetermined criterion is met, for example, when the first genre and the second genre has an identical or similar feature.

For example, as shown in FIG. 12, among the search terms "shirt navy" in the first search request, "shirt" is a genre name. Among the search terms "cut and sew white" in the second search request, "cut and sew" is a genre name. Assume that the level of "shirt" and "cut and sew" is Level 3 and that the parent genre of these is, for example, "tops". When the reference level is Level 2, the search unit 143 may search for tags including the second attribute "color=white" and the third attribute "size=large". Then, the search unit 143 gives higher priority to displaying the results of this search than to displaying the results of a search for tags including the second attribute "color=white". On the other hand, assume that "leggings white", for example, are entered as search terms of the second search request. "Leggings" is a genre name. Assume that the level of "leggings" is Level 3 and that the parent genre of "leggings" is, for example, "bottoms". Also assume that the parent genre of "bottoms" and "tops" is, for example, "fashion". Their genre commonality, however, is determined based on their ancestor genres at Level 2, which is the reference level. Since "bottoms" is not identical to "tops", the search unit 143 may search for tags including the second attribute "color=white" without searching for tags including the second attribute "color=white" and the third attribute "size=large".

In this embodiment, an item genre is identified based on entered search terms. However, for example, when a user can select an item genre as search criteria, the search unit 143 may identify the selected genre.

3-2. Operation of Information Processing System

Figure 15:
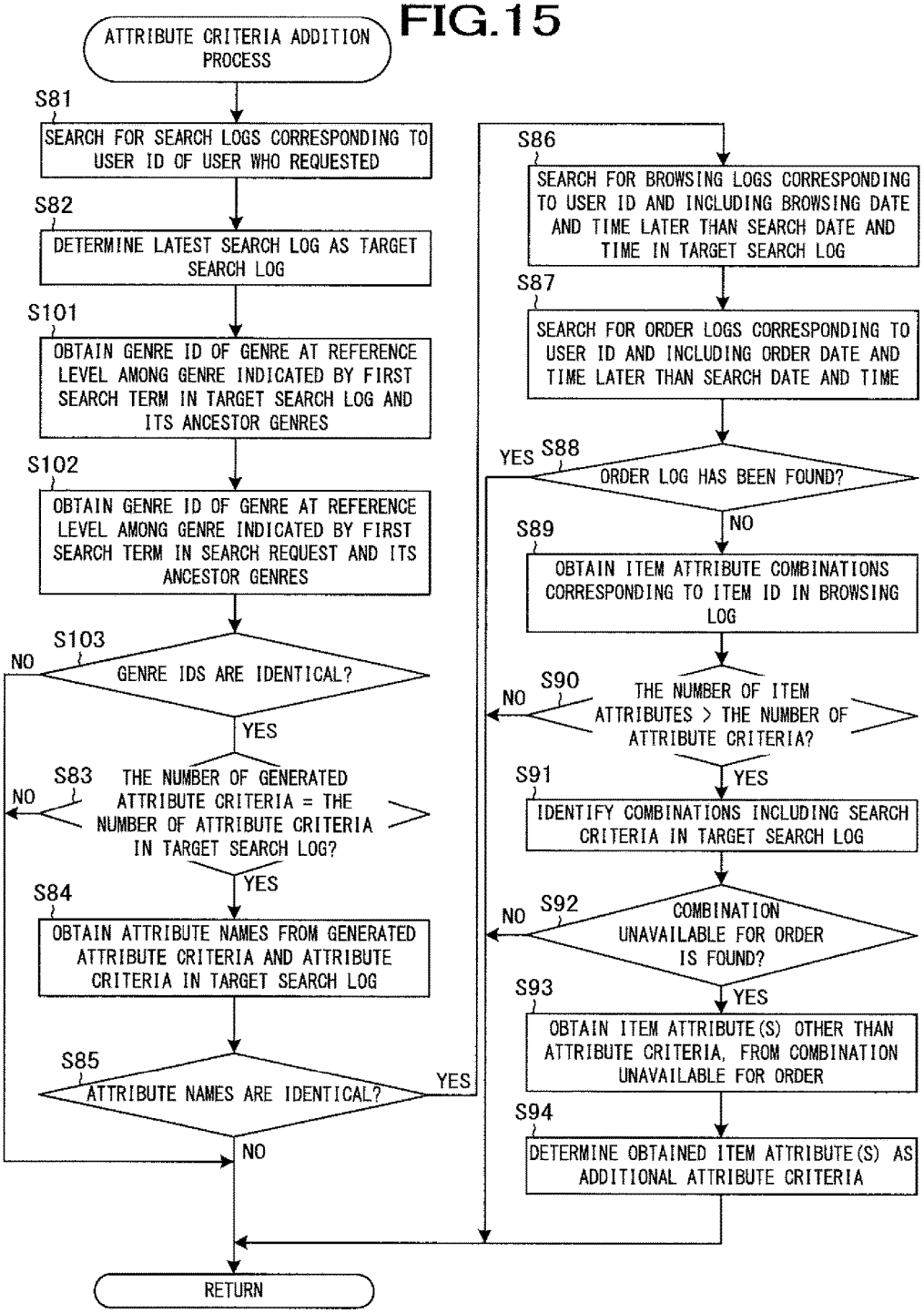
FIG. 15 is a flowchart showing an example of the attribute criteria addition process in the online shopping mall server 1 according to an embodiment.

The following describes an operation of the information processing system S with reference to FIG. 15. FIG. 15 is a flowchart showing an example of the attribute criteria addition process in the online shopping mall server 1 according to this embodiment. In FIG. 15, the same steps as those shown in FIG. 14 are denoted by the same reference signs.

As shown in FIG. 15, the search unit 143 performs Steps S81 and S82. Subsequently, the search unit 143 searches the genre DB 12b for a genre name identical or similar to the first search term included in the target search log, and obtains the genre ID corresponding to the retrieved genre name. Next, the search unit 143 retrieves the reference level from the storage unit 12. Then, the search unit 143 obtains the genre ID of the ancestor genre at the reference level among the genre indicated by the retrieved genre ID and the ancestor genres of the genre, based on the parent genre IDs stored in the genre DB 12b (Step S101). After that, the search unit 143 retrieves, from the genre DB 12b, the genre ID corresponding to a genre name identical or similar to the first search term included in the search request received this time. Subsequently, the search unit 143 obtains the genre ID of the ancestor genre at the reference level among the genre indicated by the retrieved genre ID and the ancestor genres of the genre (Step S102).

Then, the search unit 143 determines whether the genre ID obtained in Step S101 is identical to the genre ID obtained in Step S102 (Step S103). Here, if the search unit 143 determines that the genre IDs are identical (YES in Step S103), the search unit 143 performs Steps S83 to S94, as in the second embodiment. On the other hand, the search unit 143 determines that the genre IDs are not identical (NO in Step S103), the search unit 143 terminates the attribute criteria addition process.

As described above, according to this embodiment, when a commonality between the first genre identified based on the first search request and the second genre identified based on the second search request meets a predetermined criterion, the system controller 14 searches for item IDs associated with tags indicating a combination of the second attribute and the third attribute. On the other hand, when the commonality does not meet the predetermined criterion, the system controller 14 searches for item IDs associated with tags indicating combinations including the second attribute. Thus, based on the commonality of the item genres identified based on the search requests, whether the third attribute that a user has not specified as search criteria in the first search request is an attribute that the user may desire can be determined properly.

4. Fourth Embodiment 4-1. Functional Overview of System Controller

The following describes a functional overview of the system controller 14 according to a fourth embodiment with reference to FIG. 16. The search unit 143 searches for tags including both the second attribute and the third attribute, as in the second embodiment or the third embodiment. In the forth embodiment, only when a third search request has been received between the first search request and the second search request, and an item having the third attribute has been ordered among items retrieved based on the third search request, the search unit 143 searches for item IDs associated with tags including both the second attribute and the third attribute. The user, who has already ordered the item having the third attribute following the third search request, probably wishes for an item having the third attribute also at the time of making the second search request. On the other hand, if the user has not ordered any item having the third attribute, the user may not wish for an item having the third attribute. This embodiment can prevent items undesired by a user from being retrieved and thus making an item desired by the user less likely to be found by the user.

The following describes a specific example. FIG. 16 is a diagram illustrating a process of a search. For example, assume that a user specifies a search for items available for order and enters the search terms "shirt large" on the home page, as shown in FIG. 16. In this case, "large" corresponds to the first attribute. The user terminal 3 sends the first search request including the search terms. The search unit 143 retrieves tags including at least "size=large", and sends a search result page based on the item IDs corresponding to the tags. Assume that the user selects, for example, the shirt ABC from the search results and that the item page shown in FIG. 3A is then displayed.

Assume that the user enters the search term "sweater" on the home page without having ordered the shirt ABC. The user terminal 3 sends the third request including the search term. The search unit 143 performs a search based on the third request and sends a search result page to the user terminal 3. The user selects, for example, a sweater XYZ from the search result page to cause the item page to be displayed. Assume that the user then orders the sweater XYZ of navy color.

For example, assume that the user, after that, specifies a search for items available for order and enters the search terms "cut and sew large" on the home page. In this case, "large" corresponds to the second attribute. The user terminal 3 sends the second search request including the search terms. In this case, the attribute category of the first attribute is identical to the attribute category of the second attribute. The attribute category of the third attribute is "color". For the shirt ABC, combinations that include the first attribute "large" and also unavailable for order are "navy large" and "white large". Thus, "navy" and "white" are the third attributes. The attribute category "color" of the third attribute is identical to the attribute category of the attribute that the sweater XYZ ordered by the user has. The color of the sweater ordered by the user is navy, and "navy" is identical to one of the third attributes.

Thus, the search unit 143 may search for, for example, tags including the attribute criteria "size=large" among tags of items whose item page source information includes "cut and sew". The search unit 143 may also search for tags including "color=navy" among the retrieved tags. The search unit 143 may generate a search result page so that search results for the search terms "cut and sew large navy" are displayed higher, and search results for the search terms "cut and sew large" except for the search results for the search terms "cut and sew large navy" are displayed lower.

The search unit 143 may search for the item IDs associated with the tags including both the second attribute and the third attribute, for example, only when the item ordered has an attribute belonging to the same attribute category as the first attribute. Alternatively, for example, the search unit 143 may search for the item IDs associated with the tags including both the second attribute and the third attribute, only when the item ordered has the same attribute as at least one of the first attribute and the second attribute.

The search unit 143 may identify, for example, the search request before last as the first search request. Alternatively, the search unit 143 may identify, for example, a predetermined number of times prior search request as the first search request. Alternatively, the search unit 143 may determine, for example, the search requests from the last search request to the predetermined number of times prior search request as candidates for the first search request, and determine the first search request among the candidates. Alternatively, the search unit 143 may determine, for example, the search requests between the present and a predetermined time ago as candidates for the first search request, and determine the first search request among the candidates. Alternatively, the search unit 143 may determine, for example, the search requests between the user's last login to the online shopping mall and the present as candidates for the first search request, and determine the first search request among the candidates.

4-2. Operation of Information Processing System

Figure 17:
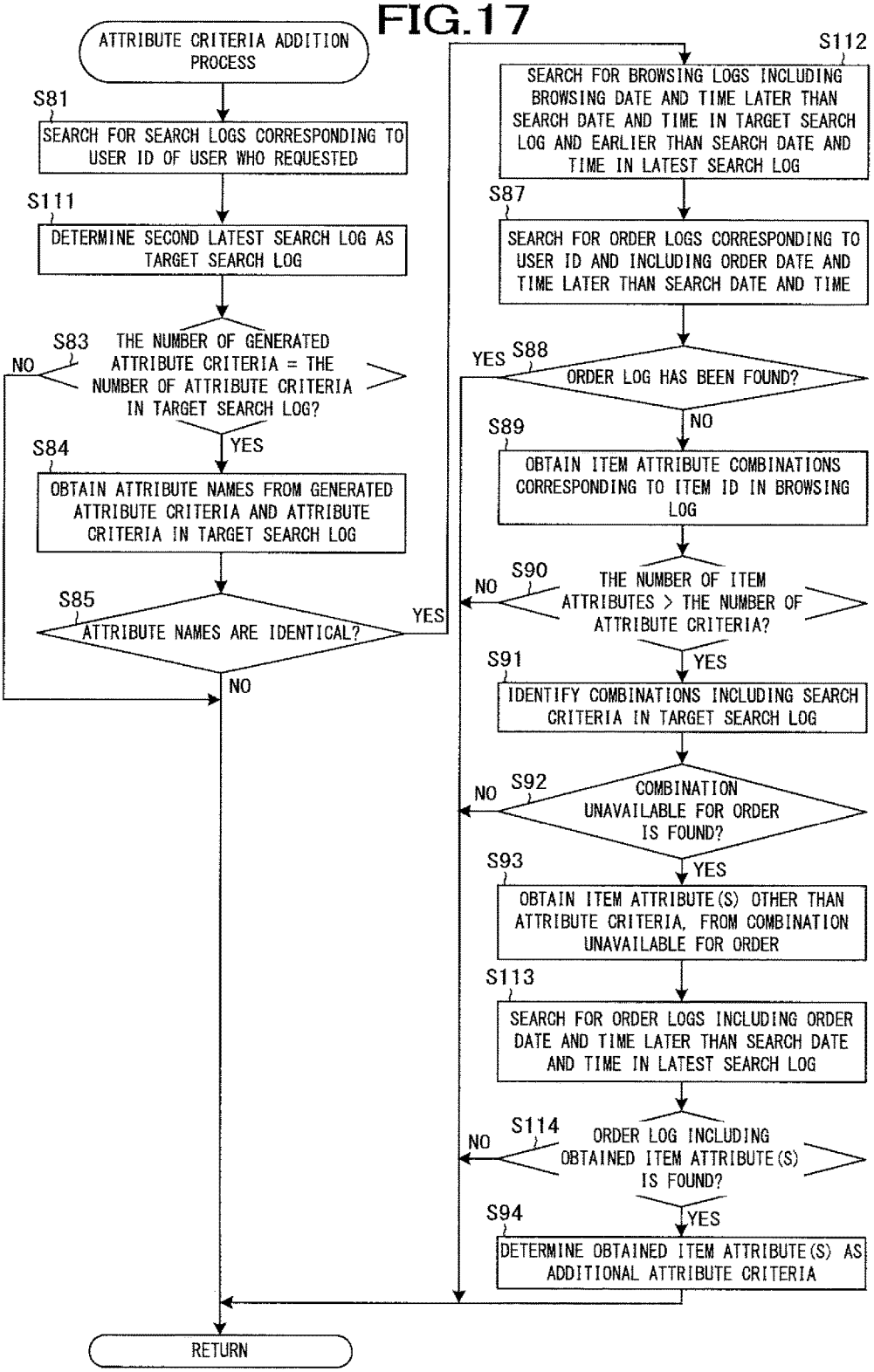
FIG. 17 is a flowchart showing an example of the attribute criteria addition process in the online shopping mall server 1 according to an embodiment.

The following describes an operation of the information processing system S with reference to FIG. 17. FIG. 17 is a flowchart showing an example of the attribute criteria addition process in the online shopping mall server 1 according to this embodiment. In FIG. 17, the same steps as those shown in FIG. 14 are denoted by the same reference signs.

As shown in FIG. 17, the search unit 143 performs Step S81. Subsequently, the search unit 143 determines the search log including the second latest search date and time among the search logs retrieved in Step S81 as a target search log (Step S111). After that, the search unit 143 performs Steps S83 to S85, as in the second embodiment. In Step S85, if the search unit 143 determines that the combination of the first attribute name(s) is identical to the combination of the second attribute name(s) (YES in Step S85), the process proceeds to Step S112.

In Step S112, the search unit 143 obtains, from the search log including the latest search date and time among the search logs retrieved in Step S81, the search date and time. Subsequently, the search unit 143 searches the browsing history DB 12h for browsing logs that correspond to the user ID of the user who requested the search and also include a browsing date and time later than the search date and time in the target search log and earlier than the search date and time in the latest search log. After that, the search unit 143 performs Steps S87 to S93, as in the second embodiment.

After Step S93, the search unit 143 searches the order history DB 12i for order logs that correspond to the user ID of the user who requested the search and also include an order date and time later than the search date and time in the latest search log (Step S113). Then, the search unit 143 determines whether an order log including the item attribute(s) obtained in Step S93 is found among the retrieved order logs (Step S114). Here, if the search unit 143 determines that an order log including the obtained item attribute(s) is found (YES in Step S114), the process proceeds to Step S94. In Step S94, the search unit 143 determines the obtained item attribute(s) as additional attribute criteria, and terminates the attribute criteria addition process. On the other hand, the search unit 143 determines that no order log including the obtained item attribute(s) is found (NO in Step S114), the search unit 143 terminates the attribute criteria addition process.

As described above, according to this embodiment, when the third search request has been received after the search based on the first search request and before receipt of the second search request, and an item retrieved based on the third search request and having the third attribute has been ordered, the system controller 14 searches for item IDs associated with tags indicating a combination of the second attribute and the third attribute. On the other hand, when no item having the third attribute has been ordered, the system controller 14 searches for item IDs associated with tags indicating combinations including the second attribute. Thus, based on the attributes of the item ordered, whether the third attribute that the user has not specified as search criteria in the first search request is an attribute that the user may desire can be determined properly.

REFERENCE SIGNS LIST 1 online shopping mall server
2 store terminal
3 user terminal
11 communication unit
12 storage unit
12a member DB
12b genre DB
12c item DB
12d item page source DB
12e stock DB12f tag DB
12g search history DB
12h browsing history DB
12i order history DB
13 input/output interface
14 system controller
14a CPU
14b ROM
14c RAM
15 system bus
141 attribute extractor
142 tag registration unit
143 search unit
NW network
S information processing system

The invention claimed is:

1. An information processing apparatus for generating tags used for an item search based on search criteria, wherein an item is associated with the item search, the apparatus comprising:
  at least one memory operable to store computer program code;
  at least one processor operable to access said computer program code and operate according to said computer program code, said computer program code including:
    extraction code configured to cause at least one of said at least one processor to:
      i) extract a plurality of combinations among combinations of attributes, in different attribute categories, of an item from display information for the item,
      ii) extract available/unavailable identification information being associated with each of the plurality of extracted combinations, and
      iii) identify available/unavailable information related to the item having a corresponding combination from the display information,
    storage code configured to cause at least one of said at least one processor to store, for each available/unavailable identification information being extracted and identifying available/unavailable information indicating availability, a first tag indicating a combination being associated with corresponding available/unavailable identification information and corresponding to search criteria of a logical AND of attributes constituting the combination, in association with item identification information identifying the item in a tag storage;
    deletion code configured to cause at least one of said at least one processor to delete, for each available/unavailable identification information being extracted and identifying available/unavailable information indicating unavailability, a second tag indicating a combination, associated with corresponding available/unavailable identification information and stored in association with the item identification information in the tag storage;
    reception code configured to cause at least one of said at least one processor to receive search criteria including a combination of attributes; and
    search code configured to cause at least one of said at least one processor to search the tag storage for a third tag indicating the combination in the received search criteria and retrieve pieces of item identification information associated with the third tag,
  wherein the extraction code, the storage code and the deletion code are configured to cause at least one of said at least one processor to perform the extracting, the storing and the deleting at predetermined intervals or when available/unavailable information associated with at least one combination among the combinations of attributes of the item has been updated.

2. The information processing apparatus according to claim 1, further comprising:
  second extraction code configured to cause at least one of said at least one processor to extract, when no combination associated with the available/unavailable identification information is extracted, one second combination of attributes, in different attribute categories, of the item from the display information, wherein
  the control code are further configured to cause at least one of said at least one processor to store a tag indicating the extracted second combination in the tag storage, only when second available/unavailable information related to the item indicates availability.

3. The information processing apparatus according to claim 1, further comprising:
  identifying code configured to cause at least one of said at least one processor to identify, after display details for a search item indicated by item identification information associated with a tag retrieved from the tag storage based on a first search request including a first attribute specified as search criteria is displayed, when a second search request including any second attribute in the same attribute category as an attribute category of the first attribute is received with the search item being not yet purchased, a third attribute other than the first attribute from a combination associated with available/unavailable identification information identifying available/unavailable information indicating unavailability among a plurality of combinations of attributes of the search item including the first attribute, the retrieved tag indicating a combination including the first attribute as an attribute, wherein the
  search code is further configured to cause at least one of said at least one processor to search the tag storage for pieces of item identification information associated with tags indicating a combination of the second attribute and the identified third attribute.

4. The information processing apparatus according to claim 2, further comprising:
  identifying code configured to cause at least one of said at least one processor to identify, after display details for a search item indicated by item identification information associated with a tag retrieved from the tag storage based on a first search request including a first attribute specified as search criteria is displayed, when a second search request including any second attribute in the same attribute category as an attribute category of the first attribute is received with the search item being not yet purchased, a third attribute other than the first attribute from an combination unavailable for order among a plurality of combinations of attributes of the search item including the first attribute, the retrieved tag indicating a combination including the first attribute as an attribute; and search code configured to cause at least one of said at least one processor to search the tag storage for pieces of item identification information associated with tags indicating a combination of the second attribute and the identified third attribute.

5. The information processing apparatus according to claim 3, wherein the search code are further configured to cause at least one of said at least one processor to search for pieces of item identification information associated with tags indicating a combination of the second attribute and the third attribute, when a commonality between a first item category, of items to be searched for, identified based on the first search request and a second item category, of items to be searched for, identified based on the second search request meets a predetermined criterion, and the search code are further configured to cause at least one of said at least one processor to search for pieces of item identification information associated with tags indicating a combination including the second attribute, when the commonality does not meet the predetermined criterion.

6. The information processing apparatus according to claim 3, wherein the search code are further configured to cause at least one of said at least one processor to search for pieces of item identification information associated with tags indicating a combination of the second attribute and the third attribute, both when a third search request has been received after the search based on the first search request and before receipt of the second search request and when an item having the third attribute has been ordered among items retrieved based on the third search request, and the search code are further configured to cause at least one of said at least one processor to search for pieces of item identification information associated with tags indicating a combination including the second attribute, when no item having the third attribute has been ordered.

7. The information processing apparatus according to claim 5, wherein the search code configured to cause at least one of said at least one processor to search for pieces of item identification information associated with tags indicating a combination of the second attribute and the third attribute, both when a third search request has been received after the search based on the first search request and before receipt of the second search request and when an item having the third attribute has been ordered among items retrieved based on the third search request, and the search code are further configured to cause at least one of said at least one processor to search for pieces of item identification information associated with tags indicating a combination including the second attribute, when no item having the third attribute has been ordered.

8. The information processing apparatus according to claim 1, further comprising:

first search code configured to cause at least one of said at least one processor to search, when a plurality of terms specified as search criteria include no attribute term indicating an item attribute, display information storage for pieces of item identification information of items available for order among pieces of item identification information associated with pieces of display information including the plurality of terms, the display information storage storing pieces of display information indicating display details for items and pieces of item identification information identifying items in association with each other; and second search code configured to cause at least one of said at least one processor to search, when the plurality of terms include one or more attribute terms indicating one or more item attributes, for pieces of item identification information associated with tags indicating combinations including the one or more item attributes identified by the one or more attribute terms, among pieces of item identification information associated with pieces of display information including one or more terms other than the one or more attribute terms in the plurality of terms.

9. The information processing apparatus according to claim 2, further comprising:

first search code configured to cause at least one of said at least one processor to search, when a plurality of terms specified as search criteria include no attribute term indicating an item attribute, display information storage for pieces of item identification information of items available for order among pieces of item identification information associated with pieces of display information including the plurality of terms, the display information storage storing pieces of display information indicating display details for items and pieces of item identification information identifying items in association with each other; and second search code configured to cause at least one of said at least one processor to search, when the plurality of terms include one or more attribute terms indicating one or more item attributes, for pieces of item identification information associated with tags indicating combinations including the one or more item attributes identified by the one or more attribute terms, among pieces of item identification information associated with pieces of display information including one or more terms other than the one or more attribute terms in the plurality of terms.

10. The information processing apparatus according to claim 3, further comprising:

first search code configured to cause at least one of said at least one processor to search, when a plurality of terms specified as search criteria include no attribute term indicating an item attribute, display information storage for pieces of item identification information of items available for order among pieces of item identification information associated with pieces of display information including the plurality of terms, the display information storage storing pieces of display information indicating display details for items and pieces of item identification information identifying items in association with each other; and second search code configured to cause at least one of said at least one processor to search, when the plurality of terms include one or more attribute terms indicating one or more item attributes, for pieces of item identification information associated with tags indicating combinations including the one or more item attributes identified by the one or more attribute terms, among pieces of item identification information associated with pieces of display information including one or more terms other than the one or more attribute terms in the plurality of terms.

11. The information processing apparatus according to claim 5, further comprising:

first search code configured to cause at least one of said at least one processor to search, when a plurality of terms specified as search criteria include no attribute term indicating an item attribute, display information storage for pieces of item identification information of items available for order among pieces of item identification information associated with pieces of display information including the plurality of terms, the display information storage storing pieces of display information indicating display details for items and pieces of item identification information identifying items in association with each other; and second search code configured to cause at least one of said at least one processor to search, when the plurality of terms include one or more attribute terms indicating one or more item attributes, for pieces of item identification information associated with tags indicating combinations including the one or more item attributes identified by the one or more attribute terms, among pieces of item identification information associated with pieces of display information including one or more terms other than the one or more attribute terms in the plurality of terms.

12. The information processing apparatus according to claim 6, further comprising:

first search code configured to cause at least one of said at least one processor to search, when a plurality of terms specified as search criteria include no attribute term indicating an item attribute, display information storage for pieces of item identification information of items available for order among pieces of item identification information associated with pieces of display information including the plurality of terms, the display information storage storing pieces of display information indicating display details for items and pieces of item identification information identifying items in association with each other; and second search code configured to cause at least one of said at least one processor to search, when the plurality of terms include one or more attribute terms indicating one or more item attributes, for pieces of item identification information associated with tags indicating combinations including the one or more item attributes identified by the one or more attribute terms, among pieces of item identification information associated with pieces of display information including one or more terms other than the one or more attribute terms in the plurality of terms.

13. An information processing method performed by at least one computer for generating tags used for an item search based on search criteria, the method comprising:

extracting a plurality of combinations among combinations of attributes, in different attribute categories, of an item from display information for the item, extracting available/unavailable identification information being associated with each of the plurality of extracted combinations, and identifying available/unavailable information related to the item having a corresponding combination from the display information;

storing, for each available/unavailable identification information being extracted and identifying available/unavailable information indicating availability, a first tag indicating a combination being associated with corresponding available/unavailable identification information and corresponding to search criteria of a logical AND of attributes constituting the combination, in association with item identification information identifying the item in a tag storage;

deleting, for each available/unavailable identification information being extracted and identifying available/unavailable information indicating unavailability, a second tag indicating a combination, associated with corresponding available/unavailable identification information and stored in association with the item identification information in the tag storage;

receiving search criteria including a combination of attributes; and searching the tag storage for a third tag indicating the combination in the received search criteria and retrieve pieces of item identification information associated with the third tag, wherein the extracting a plurality of combinations, the extracting available/unavailable identification information, the identifying, the storing and the deleting are performed at predetermined intervals or when available/unavailable information associated with at least one combination among the combinations of attributes of the item has been updated.

14. A non-transitory computer readable medium storing thereon an information processing program, the information processing program causing a computer, for generating tags used for an item search based on search criteria to:

at predetermined intervals or when available/unavailable information associated with at least one combination among combinations of attributes of an item has been updated:

i) extract a plurality of combinations among combinations of attributes, in different attribute categories, of an item from display information for the item, ii) extract available/unavailable identification information being associated with each of the plurality of extracted combinations, iii) identify available/unavailable information related to the item having a corresponding combination from the display information, iv) store, for each available/unavailable identification information being extracted and identifying available/unavailable information indicating availability, a first tag indicating a combination being associated with corresponding available/unavailable identification information and corresponding to search criteria of a logical AND of attributes constituting the combination, in association with item identification information identifying the item in a tag storage, and v) delete, for each available/unavailable identification information being extracted and identifying available/unavailable information indicating unavailability, a second tag indicating a combination, associated with corresponding available/unavailable identification information and stored in association with the item identification information in the tag storage;

receive search criteria including a combination of attributes; and search the tag storage for a third tag indicating the combination in the received search criteria and retrieve pieces of item identification information associated with the third tag.

15. The information processing apparatus according to claim 1, wherein the available/unavailable information indicates whether the item having a corresponding combination is available for order.

16. The information processing apparatus according to claim 1, wherein the display information indicates display details of a webpage that is part of an online shopping mall, and the deletion code is configured to cause at least one of said at least one processor to implement a tag registration unit to delete the second tag.

\* \* \* \* \*